United States Patent
Horn et al.

(10) Patent No.: US 12,308,934 B2
(45) Date of Patent: May 20, 2025

(54) REPEATER BEAM REQUESTS FOR TRANSPARENT BEAM MANAGEMENT

(71) Applicant: QUALCOMM Incorporated, San Diego, CA (US)

(72) Inventors: Idan Michael Horn, Hod Hasharon (IL); Assaf Touboul, Netanya (IL); Shay Landis, Hod Hasharon (IL); Yehonatan Dallal, Kfar Saba (IL)

(73) Assignee: QUALCOMM Incorporated, San Diego, CA (US)

( * ) Notice: Subject to any disclaimer, the term of this patent is extended or adjusted under 35 U.S.C. 154(b) by 456 days.

(21) Appl. No.: 17/835,767

(22) Filed: Jun. 8, 2022

(65) Prior Publication Data

US 2023/0403066 A1    Dec. 14, 2023

(51) Int. Cl.
*H04W 56/00* (2009.01)
*H04B 7/06* (2006.01)
(Continued)

(52) U.S. Cl.
CPC ....... *H04B 7/15507* (2013.01); *H04B 7/0695* (2013.01); *H04W 16/28* (2013.01); *H04W 56/001* (2013.01)

(58) Field of Classification Search
CPC ... H04L 27/2601; H04L 27/26; H04L 5/0007; H04L 5/0023; H04L 5/0048;
(Continued)

(56) References Cited

U.S. PATENT DOCUMENTS

| 11,863,373 B2 * | 1/2024 | Tsai | H04L 41/0668 |
| 2019/0174346 A1 * | 6/2019 | Murray | H04B 7/0408 |

(Continued)

FOREIGN PATENT DOCUMENTS

| EP | 4231538 A1 * | 8/2023 | H04B 7/0408 |
| EP | 3942876 B1 * | 12/2023 | H04B 17/336 |
| WO | WO-2022111393 A1 | 6/2022 | |

OTHER PUBLICATIONS

International Search Report and Written Opinion—PCT/US2023/022110—ISA/EPO—Aug. 17, 2023.

*Primary Examiner* — Nathan S Taylor
(74) *Attorney, Agent, or Firm* — QUALCOMM IP DEPT.; James Hunt Yancey, Jr.

(57) ABSTRACT

Methods, systems, and devices for wireless communications are described. A user equipment (UE) may report an initial capability to maintain latency conditions and a number of supported beams (e.g., a threshold number of beams the UE can support for relaying downlink communications such as synchronization signal blocks (SSBs)). A network entity may then transmit multiple SSBs directly to the repeater (e.g., on the same beam). The repeater may relay the SSBs across multiple beams to provide service to a coverage area. After relaying signaling between served UEs and the network entity, the repeater may transmit a report requesting a specific (e.g., improved or more accurate) number of beams (e.g., more beams or fewer beams than the number of SSBs initially provided). Upon receiving an updated configuration of a number of beams, the repeater may receive more SSBs on a single beam, and relay SSBs on the updated number of beams.

30 Claims, 15 Drawing Sheets

(51) Int. Cl.
*H04B 7/155* (2006.01)
*H04W 16/28* (2009.01)

(58) Field of Classification Search
CPC ........ H04L 5/0094; G01V 1/22; G01V 1/223; H04W 16/28; H04W 56/001; H04W 56/00; H04W 16/26; H04W 72/02; H04W 72/046; H04W 72/51; H04W 74/0841; H04W 72/04; H04W 74/08; H04B 7/04013; H04B 7/0628; H04B 7/0695; H04B 7/06952; H04B 7/15507; H04B 7/2643; H04B 7/06; H04B 7/155; H04B 7/04; H04B 7/26; H04B 7/15528; H04B 7/0888; H04B 7/0408; H04B 7/043; H04B 7/0617; H04B 7/0626; H04B 7/0639; H04B 7/086; H04B 7/15592
See application file for complete search history.

(56) References Cited

U.S. PATENT DOCUMENTS

| | | | | |
|---|---|---|---|---|
| 2020/0100154 A1* | 3/2020 | Cirik | .................. | H04W 72/20 |
| 2020/0322030 A1* | 10/2020 | Yuan | .................. | H04B 7/0626 |
| 2020/0374853 A1* | 11/2020 | Guan | .................. | H04W 24/08 |
| 2022/0174509 A1* | 6/2022 | Noh | .................. | H04B 7/15528 |
| 2022/0201503 A1* | 6/2022 | Wang | .................. | H04B 7/06966 |
| 2023/0164547 A1* | 5/2023 | Dai | .................. | H04W 12/03 |
| | | | | 713/150 |
| 2023/0247664 A1* | 8/2023 | Bai | .................. | H04W 72/542 |
| | | | | 370/329 |
| 2023/0262678 A1* | 8/2023 | Fan | .................. | H04B 7/0695 |
| | | | | 370/329 |
| 2023/0361827 A1* | 11/2023 | Fan | .................. | H04B 7/0617 |
| 2023/0396307 A1* | 12/2023 | Bhamri | .................. | H04B 7/06966 |
| 2024/0022931 A1* | 1/2024 | MolavianJazi | .................. | H04B 7/155 |
| 2024/0163688 A1* | 5/2024 | Tsai | .................. | H04L 5/0094 |
| 2024/0196178 A1* | 6/2024 | Ying | .................. | H04W 8/18 |

* cited by examiner

REPEATER BEAM REQUESTS FOR TRANSPARENT BEAM MANAGEMENT

FIELD OF TECHNOLOGY

The following relates to wireless communications, including repeater beam requests for transparent beam management.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support repeater beam requests for transparent beam management. For example, a user equipment (UE) may report an initial capability to maintain latency conditions and a number of supported beams (e.g., a threshold number of beams the UE can support for relaying downlink communications such as synchronization signal blocks (SSBs)) according to the specified latency conditions. A network entity may then transmit SSBs, and may transmit a subset (e.g., multiple) of SSBs directly to the repeater (e.g., on the same beam instead of on multiple beams). The repeater may relay the SSBs across multiple beams to provide service to a coverage area (e.g., a geographic region not served directly by the network entity based on blockages or structures, or an interior of a structure, etc.). After relaying signaling between any served UEs and the network entity, the repeater may transmit a report requesting a specific (e.g., improved or more accurate) number of beams (e.g., more beams or fewer beams than the number of SSBs initially provided and relayed by the repeater). The UE may include, in the report, a request for a number of beams, or direction of beams, and may determine the number of beams to request based on served UEs, traffic, coverage area, or spatial sensors, among other examples. Upon receiving an updated configuration of a number of beams, the repeater may receive more SSBs, and relay them on the updated number of beams.

A method for wireless communications at a repeater is described. The method may include transmitting a capability report including an indication of a latency capability and a quantity of beams supported by the repeater, receiving a set of multiple SSBs via a first beam, each SSB of the set of multiple SSBs corresponding to a respective SSB index, where a quantity of the set of multiple SSBs satisfies the quantity of beams supported by the repeater, relaying the set of multiple SSBs via a first set of beams associated with a coverage area served by the repeater, and transmitting, based on relaying the set of multiple SSBs via the first set of beams, a repeater report including an indication of a second set of beams associated with service to one or more UEs located in the coverage area served by the repeater.

An apparatus for wireless communications at a repeater is described. The apparatus may include a processor, memory coupled with the processor, and instructions stored in the memory. The instructions may be executable by the processor to cause the apparatus to transmit a capability report including an indication of a latency capability and a quantity of beams supported by the repeater, receive a set of multiple SSBs via a first beam, each SSB of the set of multiple SSBs corresponding to a respective SSB index, where a quantity of the set of multiple SSBs satisfies the quantity of beams supported by the repeater, relay the set of multiple SSBs via a first set of beams associated with a coverage area served by the repeater, and transmit, based on relaying the set of multiple SSBs via the first set of beams, a repeater report including an indication of a second set of beams associated with service to one or more UEs located in the coverage area served by the repeater.

Another apparatus for wireless communications at a repeater is described. The apparatus may include means for transmitting a capability report including an indication of a latency capability and a quantity of beams supported by the repeater, means for receiving a set of multiple SSBs via a first beam, each SSB of the set of multiple SSBs corresponding to a respective SSB index, where a quantity of the set of multiple SSBs satisfies the quantity of beams supported by the repeater, means for relaying the set of multiple SSBs via a first set of beams associated with a coverage area served by the repeater, and means for transmitting, based on relaying the set of multiple SSBs via the first set of beams, a repeater report including an indication of a second set of beams associated with service to one or more UEs located in the coverage area served by the repeater.

A non-transitory computer-readable medium storing code for wireless communications at a repeater is described. The code may include instructions executable by a processor to transmit a capability report including an indication of a latency capability and a quantity of beams supported by the repeater, receive a set of multiple SSBs via a first beam, each SSB of the set of multiple SSBs corresponding to a respective SSB index, where a quantity of the set of multiple SSBs satisfies the quantity of beams supported by the repeater, relay the set of multiple SSBs via a first set of beams associated with a coverage area served by the repeater, and transmit, based on relaying the set of multiple SSBs via the first set of beams, a repeater report including an indication of a second set of beams associated with service to one or more UEs located in the coverage area served by the repeater.

Some examples of the method, apparatuses, and non-transitory computer-readable medium described herein may further include operations, features, means, or instructions for receiving, based on transmitting the repeater report, a beam assignment message including beam information for the second set of beams.

In some examples of the method, apparatuses, and non-transitory computer-readable medium described herein, the beam assignment message may include operations, features, means, or instructions for an indication of a quantity of beams of the second set of beams, an indication of a beam direction for each beam of the second set of beams, or a combination thereof, where the second set of beams be different from the first set of beams.

In some examples of the method, apparatuses, and non-transitory computer-readable medium described herein, the beam assignment message may include operations, features, means, or instructions for a one-bit message indicating that the second set of beams may be the same as the first set of beams.

Some examples of the method, apparatuses, and non-transitory computer-readable medium described herein may further include operations, features, means, or instructions for receiving a second set of multiple SSBs via the first beam, each SSB of the second set of multiple SSBs corresponding to a respective SSB index, where a quantity of the second set of multiple SSBs satisfies the second set of beams and relaying the second set of multiple SSBs via the second set of beams.

In some examples of the method, apparatuses, and non-transitory computer-readable medium described herein, the repeater report may include operations, features, means, or instructions for a quantity of beams of the second set of beams, a periodicity of the second set of beams, a threshold time between duplicate beams of the first set of beams, or a combination thereof.

Some examples of the method, apparatuses, and non-transitory computer-readable medium described herein may further include operations, features, means, or instructions for estimating a quantity of beams of the second set of beams based on a number of random access occasions associated with random access messages relayed by the repeater from the one or more UEs to a network entity, a quantity of UEs located in the coverage area served by the repeater, a spatial separation between respective beams of the first set of beams, or a combination thereof, where transmitting the repeater report may be based on estimating the quantity of beams.

Some examples of the method, apparatuses, and non-transitory computer-readable medium described herein may further include operations, features, means, or instructions for determining a size of the coverage area served by the repeater based on one or more sensors, a preconfigured area input by a user, a history of locations of the one or more UEs served by the repeater, a quantity of messages received from the one or more UEs based on relaying the set of multiple SSBs, or a combination thereof and estimating a quantity of beams of the second set of beams based on the size of the coverage area served by the repeater, where transmitting the repeater report may be based on estimating the quantity of beams.

In some examples of the method, apparatuses, and non-transitory computer-readable medium described herein, relaying, based on relaying the set of multiple SSBs, signaling from a network entity to one or more UEs served by the repeater, and signaling from the one or more UEs to the network entity.

In some examples of the method, apparatuses, and non-transitory computer-readable medium described herein, relaying the signaling from the network entity to the one or more UEs and the signaling from the one or more UEs to the network entity may include operations, features, means, or instructions for receiving random access messages associated with respective SSB indices of the set of multiple SSBs from the one or more UEs using the first set of beams and relaying the received random access messages to the network entity using the first beam.

Some examples of the method, apparatuses, and non-transitory computer-readable medium described herein may further include operations, features, means, or instructions for receiving, from a network entity, an indication of a set of SSB indices including each respective SSB index corresponding to each SSB of the set of multiple SSBs and determining, based on the indication of the set of SSB indices, a time occasion for receiving each SSB of the set of multiple SSBs, where receiving the set of multiple SSBs may be based on the determining.

A method for wireless communications at a network entity is described. The method may include obtaining a capability report including an indication of a latency capability and a quantity of beams supported by a repeater, outputting a set of multiple SSBs via a first beam, each SSB of the set of multiple SSBs corresponding to a respective SSB index, where a quantity of the set of multiple SSBs correspond to a quantity of beams of a first set of beams that satisfies the quantity of beams supported by the repeater, obtaining, via the repeater, one or more uplink messages from one or more UEs served by the repeater based on outputting the set of multiple SSBs, and obtaining a repeater report including an indication of a second set of beams associated with service, by the repeater, to one or more UEs located in a coverage area served by the repeater.

An apparatus for wireless communications at a network entity is described. The apparatus may include a processor, memory coupled with the processor, and instructions stored in the memory. The instructions may be executable by the processor to cause the apparatus to obtain a capability report including an indication of a latency capability and a quantity of beams supported by a repeater, output a set of multiple SSBs via a first beam, each SSB of the set of multiple SSBs corresponding to a respective SSB index, where a quantity of the set of multiple SSBs correspond to a quantity of beams of a first set of beams that satisfies the quantity of beams supported by the repeater, obtain, via the repeater, one or more uplink messages from one or more UEs served by the repeater based on outputting the set of multiple SSBs, and obtain a repeater report including an indication of a second set of beams associated with service, by the repeater, to one or more UEs located in a coverage area served by the repeater.

Another apparatus for wireless communications at a network entity is described. The apparatus may include means for obtaining a capability report including an indication of a latency capability and a quantity of beams supported by a repeater, means for outputting a set of multiple SSBs via a first beam, each SSB of the set of multiple SSBs corresponding to a respective SSB index, where a quantity of the set of multiple SSBs correspond to a quantity of beams of a first set of beams that satisfies the quantity of beams supported by the repeater, means for obtaining, via the repeater, one or more uplink messages from one or more UEs served by the repeater based on outputting the set of multiple SSBs, and means for obtaining a repeater report including an indication of a second set of beams associated with service, by the repeater, to one or more UEs located in a coverage area served by the repeater.

A non-transitory computer-readable medium storing code for wireless communications at a network entity is described. The code may include instructions executable by a processor to obtain a capability report including an indication of a latency capability and a quantity of beams supported by a repeater, output a set of multiple SSBs via a first beam, each SSB of the set of multiple SSBs corresponding to a respective SSB index, where a quantity of the set of multiple SSBs correspond to a quantity of beams of a first set of beams that satisfies the quantity of beams supported by the repeater, obtain, via the repeater, one or more uplink messages from one or more UEs served by the repeater based on outputting the set of multiple SSBs, and obtain a repeater report including an indication of a second set of beams associated with service, by the repeater, to one or more UEs located in a coverage area served by the repeater.

Some examples of the method, apparatuses, and non-transitory computer-readable medium described herein may further include operations, features, means, or instructions for outputting, based on obtaining the repeater report, a beam assignment message including beam information for the second set of beams.

In some examples of the method, apparatuses, and non-transitory computer-readable medium described herein, the beam assignment message may include operations, features, means, or instructions for an indication of a quantity of beams of the second set of beams, an indication of a beam direction for each beam of the second set of beams, or a combination thereof, where the second set of beams may be different from the first set of beams.

In some examples of the method, apparatuses, and non-transitory computer-readable medium described herein, the beam assignment message may include operations, features, means, or instructions for a one-bit message indicating that the second set of beams may be the same as the first set of beams.

Some examples of the method, apparatuses, and non-transitory computer-readable medium described herein may further include operations, features, means, or instructions for outputting a second set of multiple SSBs via a second beam, each SSB of the second set of multiple SSBs corresponding to a respective SSB index, where a quantity of the second set of multiple SSBs satisfies the second set of beams.

In some examples of the method, apparatuses, and non-transitory computer-readable medium described herein, the repeater report may include operations, features, means, or instructions for a quantity of beams of the second set of beams, a periodicity of the second set of beams, a threshold time between duplicate beams of the first set of beams, or a combination thereof.

Some examples of the method, apparatuses, and non-transitory computer-readable medium described herein may further include operations, features, means, or instructions for outputting an indication of a set of SSB indices including each respective SSB index corresponding to each SSB of the set of multiple SSBs, where outputting the set of multiple SSBs may be based on outputting the indication of the set of SSB indices.

DETAILED DESCRIPTION

Figure 1:
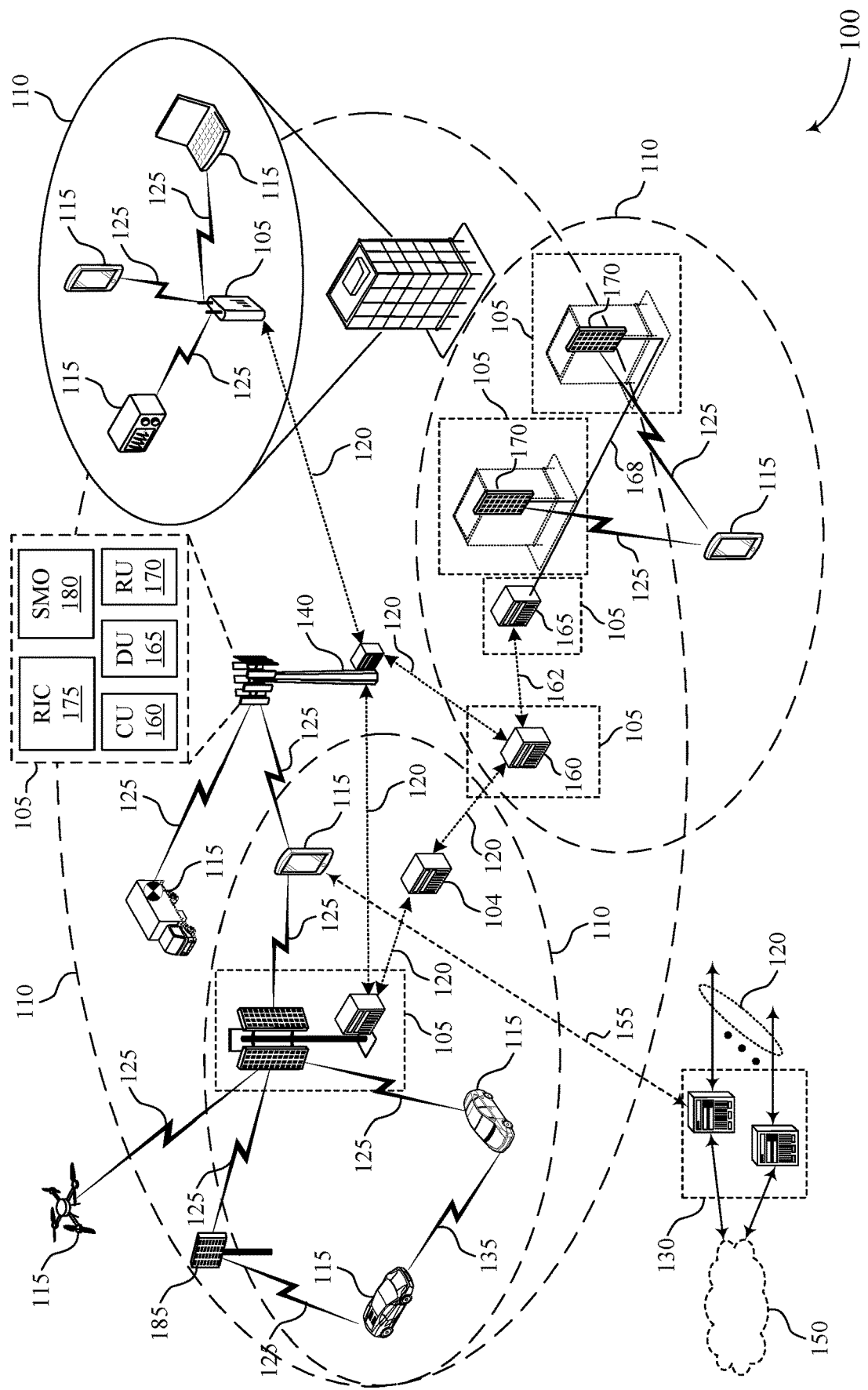
FIG. 1 illustrates an example of a wireless communications system that supports repeater beam requests for transparent beam management in accordance with one or more aspects of the present disclosure.

In some wireless communications systems, line of sight (LOS) channels may improve or extend coverage and increase throughput. Some communications may rely on (e.g., may fail without) utilizing LOS channels. However, in some cases (e.g., indoor or urban deployments), LOS channels may be difficult to identify or utilize. For example, some UEs may be unable to communicate with one or more network entities using LOS channels due to blockages (e.g., buildings or other structures), or UE location (e.g., inside of a structure or room). Thus, a wireless communications system may include one or more repeaters (e.g., relays, femto-cells, reconfigurable intelligent surfaces (RISs), etc.) to relay signaling between wireless nodes (e.g., between the network entity and one or more UEs). For example, a repeater may facilitate LOS channels between the repeater and a network device, and between the repeater and one or more UEs, resulting in an effective LOS channel between UEs and network entities.

A repeater may maintain low latency communications between a network entity and one or more UEs by ensuring that channel delay spread does not exceed a threshold (e.g., does not pass a cyclic prefix (CP) length). The repeater may be capable of extending coverage to specific spatial areas (e.g., a room inside of a structure). In some examples, the UE may communicate directly with the repeater (e.g., may establish a separate communication link with the repeater, and may send transmissions to the repeater for relaying to the network entity or monitor for communications from the repeater relaying downlink signaling from the network entity).

Similarly, a network entity may establish a communication link with the repeater and may transmit downlink signaling to the repeater for relaying to the UE and may monitor for signaling from the repeater relaying uplink communication from the UE. Such communications may be referred to as non-transparent relaying (e.g., where the UE establishes a unique connection with the repeater and performs wireless communications with the repeater based on the assumption that the repeater will communicate with the network entity). However, such non-transparent relaying may result in expending time and computational resources by one or more wireless nodes, increased latency and system delays for relaying signaling, and an inability to satisfy low latency communication requirements, resulting in inter-symbol interference.

In some examples, as described herein, the network entity may support transparent relaying and beam management procedures. For example, the UE may communicate directly with the network entity (via the repeater) but without establishing a communication link with the repeater itself (e.g., without any recognition that the repeater is present, or part of the communication link). That is, instead of communicating directly with the repeater such that the repeater can relay communications on to the network entity (e.g., as may be the case in non-transparent repeater communications), the UE may communicate directly with the network entity (e.g., and the repeater may facilitate LOS channels for such communications, despite the UE lacking any information as to the existence of the repeater, or its role in communicating with the network entity).

To support transparent beam management procedures, the network entity may transmit synchronization signal blocks (SSBs) using multiple beams to cover multiple directions. In some examples, the network entity may transmit multiple SSBs using a single beam (e.g., in a single direction) toward a repeater, and the repeater may relay the multiple received SSBs along multiple beams to serve one or more UEs that would otherwise be unable to communicate with the network entity. The repeater may facilitate communications between the one or more served UEs and the network entity, based on relaying the SSBs (e.g., may relay random access messages between the UE and the network entity based on relaying the SSBs).

In some examples, the UE may report an initial capability to maintain latency conditions and a number of supported beams (e.g., a threshold number of beams the UE can support for relaying downlink communications such as SSBs). The network entity may then transmit SSBs, and may transmit a subset (e.g., multiple) of SSBs directly to the repeater (e.g., on the same beam instead of on multiple beams). The repeater may relay the SSBs across multiple beams to provide service to a coverage area (e.g., a geographic region not served directly by the network entity based on blockages or structures, or an interior of a structure, etc.).

After relaying signaling between any served UEs and the network entity, the repeater may transmit a report requesting a specific (e.g., improved or more accurate) number of beams (e.g., more beams or fewer beams than the number of SSBs initially provided). The UE may include, in the report, a request for a number of beams, or direction of beams, and may determine the number of beams to request based on served UEs, traffic, coverage area, or spatial sensors, among other examples. Upon receiving an updated configuration of a number of beams, the repeater may receive more SSBs, and relay them on the updated number of beams. Some advantages of the present disclosure may include enabling cell edge increase with low complexity repeaters.

Aspects of the disclosure are initially described in the context of wireless communications systems. Aspects of the disclosure are further illustrated by and described with reference to wireless communications systems and process flows. Aspects of the disclosure are further illustrated by and described with reference to apparatus diagrams, system diagrams, and flowcharts that relate to repeater beam requests for transparent beam management.

FIG. 1 illustrates an example of a wireless communications system 100 that supports repeater beam requests for transparent beam management in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)). In some examples, wireless communications system 100 may include a repeater 185. The repeater 185 may be an example of a relay, a femto-cell, RIS, etc. The repeater 185 may extend coverage with limited (e.g., negligible) power consumption. The repeater 185 may be a near passive device or an active device, and may reflect impinging waves in a desired direction. In some examples, a repeater 185 may an example of a network entity 105. In some examples, the repeater 185 may facilitate communications between another network entity 105 and a UE 115.

The split of functionality between a CU 160, a DU 165, and an RU 170 is flexible and may support different functionalities depending upon which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 via an interface (e.g., a backhaul link). IAB donor and IAB nodes 104 may communicate via an F1 interface according to a protocol that defines signaling messages (e.g., an F1 AP protocol). Additionally, or alternatively, the CU 160 may communicate with the core network via an interface, which may be an example of a portion of backhaul link, and may communicate with other CUs 160 (e.g., a CU 160 associated with an alternative IAB donor) via an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, or referred to as a child IAB node associated with an IAB donor, or both. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, or may directly signal transmissions to a UE 115, or both. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling via an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support repeater beam requests for transparent beam management as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, network entities 105 may have different frame timings, and transmissions from different network entities 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., fewer than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

As described herein, a transmitting device (e.g., a UE 115, a network entity 105, a repeater 185, or any other wireless node) may perform transmissions, or may output wireless signaling. Similarly, a receiving device (e.g., a UE 115, a network entity 105, a repeater 185, or any other wireless node) may perform receptions, or may obtain wireless signaling. Outputting signaling may include outputting a set of bits to a modem or other device for modulation, encoding, and transmission, or may include outputting a modulated carrier wave to an amplifier for transmission over an antenna, or may include outputting a modulated carrier wave to an external device for transmission, etc. Obtaining signaling may include obtaining, receiving, or forwarding a set of bits at or to a modem of a device for demodulation and decoding, or may include obtaining a modulated carrier wave for reception via one or more antennas, or may include obtaining a modulated carrier wave at an external device (e.g., for decoding or for forwarding to a modem for decoding), among other examples.

In some examples, the UE 115 may report an initial capability to maintain latency conditions and a number of supported beams (e.g., a threshold number of beams the UE 115 can support for relaying downlink communications such as SSBs) according to the specified latency conditions. The network entity 105 may then transmit SSBs, and may transmit a subset (e.g., multiple) of SSBs directly to the repeater (e.g., on the same beam instead of on multiple beams). The repeater may relay the SSBs across multiple beams to provide service to a coverage area (e.g., a geographic region not served directly by the network entity 105 based on blockages or structures, or an interior of a structure, etc.). After relaying signaling between any served UEs 115 and the network entity, the repeater may transmit a report requesting a specific (e.g., improved or more accurate) number of beams (e.g., more beams or fewer beams than the number of SSBs initially provided and relayed by the repeater). The UE 115 may include, in the report, a request for a number of beams, or direction of beams, and may determine the number of beams to request based on served UEs 115, traffic, coverage area, or spatial sensors, among other examples. Upon receiving an updated configuration of a number of beams, the repeater may receive more SSBs, and relay them on the updated number of beams. Some advantages of the present disclosure may include enabling cell edge increase with low complexity repeaters.

Figure 2A:
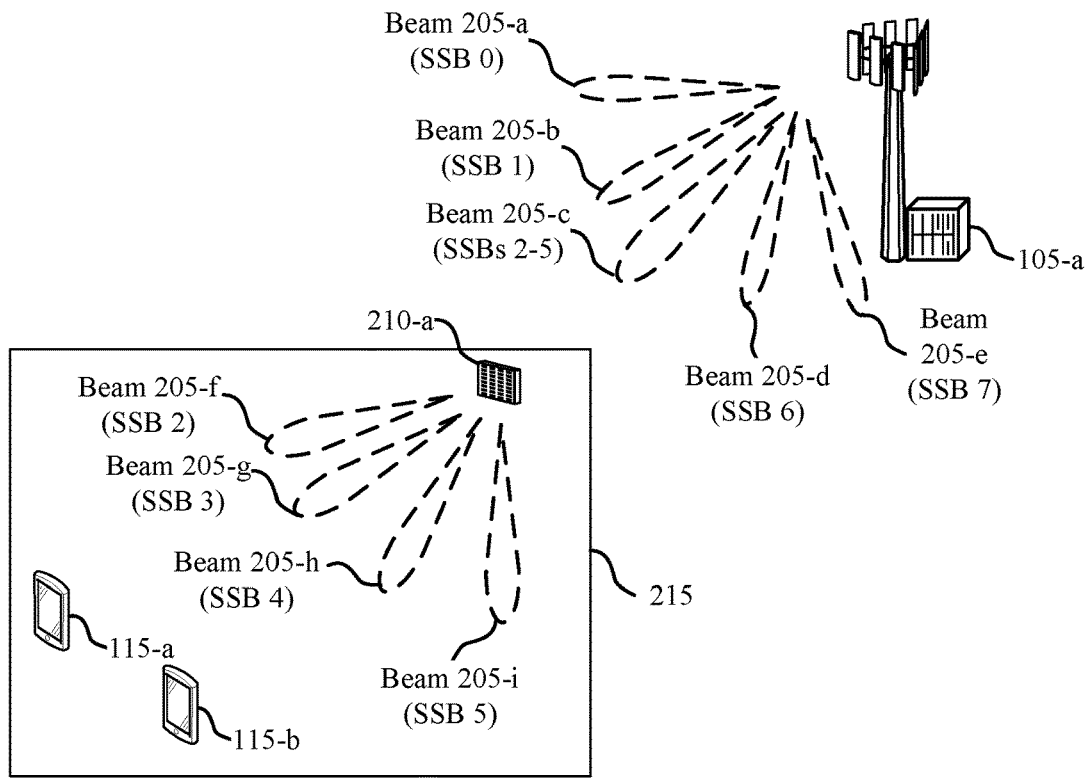
FIG. 2A illustrates an example of a wireless communications system that supports repeater beam requests for transparent beam management in accordance with one or more aspects of the present disclosure.
Figure 2B:
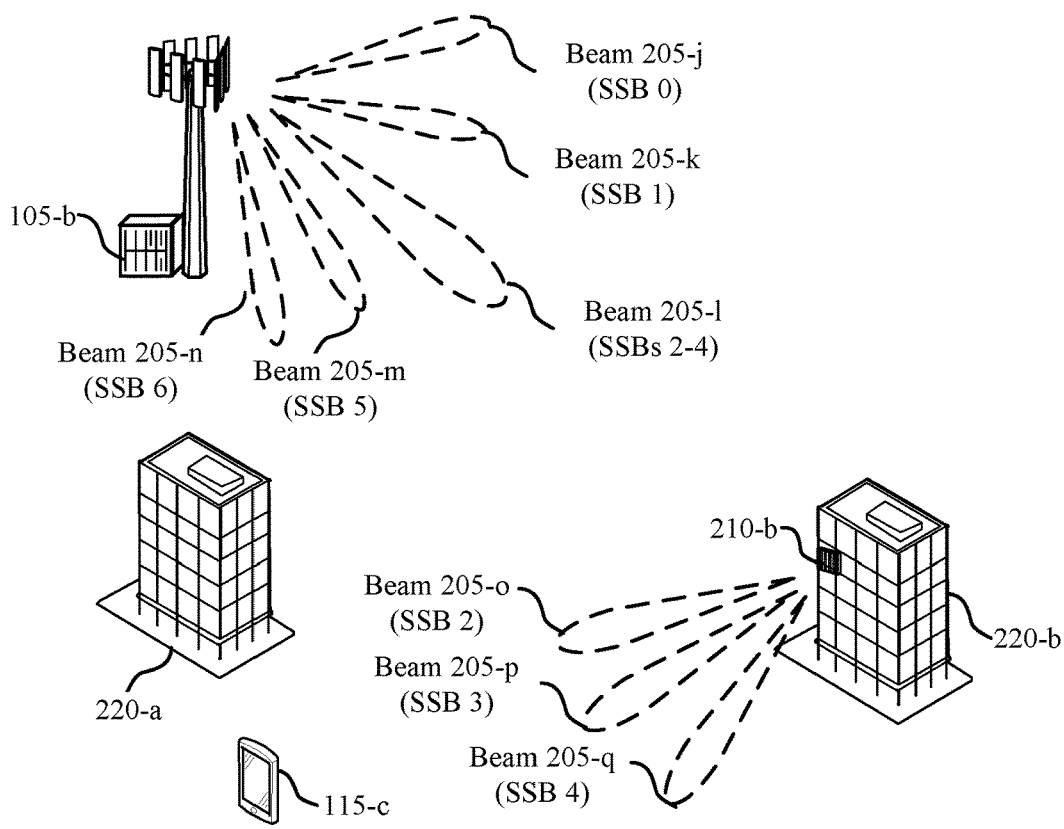
FIG. 2B illustrates an example of a wireless communications system that supports repeater beam requests for transparent beam management in accordance with one or more aspects of the present disclosure.

FIG. 2A illustrates an example of a wireless communications system 200, and FIG. 2B illustrates an example of a wireless communications system 201 that supports repeater beam requests for transparent beam management in accordance with one or more aspects of the present disclosure. Wireless communications system 200 may include one or more network entities 105 (e.g., the network entity 105-*a*) one or more repeaters 210 (e.g., the repeater 210-*a*), and one or more UEs 115 (e.g., the UE 115-*a* and the UE 115-*b*). The wireless communications system 201 may include one or more network entities 105 (e.g., the network entity 105-*b*), one or more repeaters 210 (e.g., the repeater 210-*b*), and one or more UEs 115 (e.g., the UE 115-*c*).

Wireless devices in the wireless communications system 200 or the wireless communications system 201 may communicate using LOS channels, which may result in improved quality of coverage and increased throughput. However, in indoor or urban deployments, availability of LOS channels may be limited. Thus, deployment may rely one or more repeaters 210 (e.g., relays, femto-cells, RISs, etc.) to relay signaling between wireless nodes. Relaying signaling may include penetrating a window or bypassing a blocker, as shown in both FIGS. 2A and 2B.

In some examples, the repeaters 210 may maintain low latency communications between UEs 115 and network entities 105, such that the UE channel delay spread satisfies a threshold (e.g., the channel delay spread for a UE 115 remains within a CP length). The repeaters 210 may also provide coverage to a particular spatial area (e.g., a room 215 as illustrated with reference to FIG. 2A, or an otherwise inaccessible area as illustrated with reference to FIG. 2B). The repeaters 210 may support communication to multiple UEs 115. In some examples, the repeaters 210 may represent zero delay repeaters, which may be utilized to avoid low noise amplifier (LNA) oscillation from transmitting leakage. The repeaters 210 may support isolation techniques, which may include antenna physical separation, antenna polarization switching, active cancellation which may be based on analog cancellation, or any combination thereof.

The repeaters 210 may not support digital processing on received SSBs transmitted on the beams 205 (e.g., which may be derived from a relaying low latency threshold (e.g., lower than a CP length)). In some examples, conditions for the transparent beam management procedure may include the network entity 105 *a* transmitting multiple beams 205 in the same direction of the repeater 210-*a*. Then, the repeater 210-*a* may relay the beam 205 received from the network entity 105 *a* to different spatial location (e.g., where the UEs 115 are located). Although illustrated with reference to a single beam 205 carrying multiple SSBs, in some examples, the repeaters 210 may receive the multiple SSBs from a single TRP (e.g., a single network entity 105) or from multiple TRPs (e.g., in a multiple TRP (mTRP) deployment).

In some examples, to support low latency relaying by the repeaters 210, the repeaters 210 may perform transparent beam management procedures (TBMPs). In such examples, the network entities 105 may transmit SSBs in different spatial directions, but may transmit multiple SSBs on a single beam 205 in the direction of a repeater 210. In such examples, the repeater 210 may then forward the multiple received SSBs using multiple beams 205. In some examples, to support transparent beam management procedures, the repeaters 210 may request a number of supported beams 205 (e.g., a threshold number of beams 205), and may subsequently estimate and request an updated or more accurate number of requested beams 205, and the network entities 105 may provide the requested number of SSBs on a single beam 205 to the repeaters 210, as described in greater detail with reference to FIGS. 2A, 2B, and 3.

As illustrated with reference to FIG. 2A, the network entity 105-*a*, the repeater 210-*a*, the UE 115-*a*, and the UE 115-*b*, may perform an example of a transparent beam management procedure, which may be an example of an outdoor to indoor scenario. In some examples, the UE 115-*a* and the UE 115-*b* may be located in a geographical region that does not support a LOS channel with the network entity 105-*a* (e.g., inside of a room 215). The repeater 210-*a* may support transparent beam management procedures with the UEs 115, and may relay signaling between the network entity 105-*a* and the UEs 115 accordingly.

The network entity 105-*a* may transmit multiple SSBs on multiple beams 205. However, the network entity 105-*a* may transmit multiple SSBs on a single beam 205 to the repeater 210-*a*, which may be mounted on a surface (e.g., a window of a room 215). For example, the network entity 105-*a* may transmit SSB 0 on beam 205-*a*, may transmit SSB 1 on beam 205-*a*, may transmit SSB 6 on beam 205-*d*, and may transmit SSB 7 on beam 205-*e*. However, the UE 115-*a* and the UE 115-*b* may not receive signaling on beam 205-*a*, beam 205-*b*, beam 205-*d*, or beam 205-*e*. In some examples, the UE 115-*a* and the UE 115-*b* may also be unable to directly receive signaling transmitted on the beam 205-*c* (e.g., resulting from the walls of the room 215, or the location of the UEs 115 within the room 215). When performing a transparent beam management procedure, the network entity 105-*a* may also transmit multiple SSBs (e.g., the SSBs 2 through 5) on beam 205-*c*, which may be directed toward the repeater 210-*a* (e.g., the beam indices associated with SSB 2, SSB3, SSB 4, and SSB 5, may be spatially correlated). The repeater 210-*a* may then relay the received SSBs (e.g., the SSBs 2 through 5) to a coverage area not reached by the network entity 105 (e.g., the room 215). For instance, upon receiving the SSBs 2 through 5 on the beam 205-*c*, the repeater 210-*a* may relay SSB 2 on the beam 205-*f*, may relay SSB 3 on the beam 205-*g*, may relay SSB 4 on the beam 205-*h*, and may relay SSB 5 on the beam 205-*i*. The UEs 115 in the room 215 may receive at least one SSB, based on which the UEs 115 may perform random access procedures with the network entity 105-*a*.

FIG. 2B illustrates an example of a wireless communications system 201 that supports repeater beam requests for transparent beam management in accordance with one or more aspects of the present disclosure. The wireless communications system 201 may include one or more network entities 105 (e.g., the network entity 105-*b*), one or more repeaters 210 (e.g., the repeater 210-*b*), and one or more UEs 115 (e.g., the UE 115-*c*).

As illustrated with reference to FIG. 2B, the network entity 105-*b*, the repeater 210-*b*, and the UE 115-*c*, may perform an example of a transparent beam management procedure which may be an example of an outdoor to outdoor scenario. In some examples, the UE 115-*c* may be located in a geographical region that does not support a LOS channel with the network entity 105-*b* (e.g., the network entity may not be able to successfully communicate with the UE 115-*c* using the beam 205-*n* because the UE 115-*c* is located on the opposite side of a blockage such as the structure 220-*a*). The repeater 210-*b* may support transparent beam management procedures with the UE 115-*c*, and may relay signaling between the network entity 105-*a* and the UE 115-*c* accordingly.

The network entity 105 *b* may transmit multiple SSBs on multiple beams 205. However, the network entity 105-*b* may transmit multiple SSBs on a single beam 205 to the repeater 210 *b*, which may be mounted on a surface (e.g., a structure 220-*b*) or another point within the wireless communications system 201. For example, the network entity 105-*a* may transmit SSB 0 on beam 205-*j*, may transmit SSB 1 on beam 205-*k*, may transmit SSB 5 on beam 205-*m*, and may transmit SSB 6 on beam 205-*n*. However, the UE 115-*c* may not receive signaling on beam 205-*j*, beam 205-*k*, beam 205-*m*, or beam 205-*n* (e.g., because of its location on the opposite side of the structure 220-*a*). In some examples, the UE 115-*c* may also be unable to directly receive signaling transmitted on the beam 205-*l* (e.g., resulting from direction of the beam 205-*l*, which may be oriented toward the repeater 210-*b*). When performing a transparent beam management procedure, the network entity 105-*b* may also transmit multiple SSBs (e.g., the SSBs 2 through 4) on beam 205-*l*, which may be directed toward the repeater 210-*a* (e.g., the beam indices associated with SSB 2, SSB3, and SSB 4, may be spatially correlated). The repeater 210-*b* may then relay the received SSBs (e.g., the SSBs 2 through 4) to a coverage area not reached by the network entity 105-*b*. For instance, upon receiving the SSBs 2 through 4 on the beam 205-*l*, the repeater 210-*b* may relay SSB 2 on the beam 205-*o*, may relay SSB 3 on the beam 205-*p*, and may relay SSB 4 on the beam 205-*q*. The UE 115-*c* located on the opposite side of obstructions (e.g., such as the structure 220-*a*) may receive at least one SSB (e.g., at least on the beam 205-*p*), based on which the UE 115-*c* may perform random access procedures with the network entity 105-*b*.

Techniques described herein may support such transparent beam management procedures. However, network entities 105 may not be able to support such procedures without receiving information from the repeaters 210 indicating a number of beams requested by the repeaters 210 (e.g., a number of spatially correlated SSB indices for SSBs to be transmitted on a single beam toward a particular repeater 210). Thus, as described in greater detail with reference to FIG. 3, a repeater 210 may transmit one or more reports (e.g., beam reports) indicating a number of requested beams for the repeater (e.g., a number of beams for the repeater 210 to convey good spatial coverage to a captured area). As described here, a repeater 210 may transmit a report of a threshold number of requested beams. A network entity 105 may then provide the requested number of SSBs in the direction of the repeater 210. The repeater 210 may then relay the SSBs to its coverage area, and facilitate communications between one or more UEs 115 and the network entity 105. The repeater 210 may estimate a number of SSBs (e.g., a number of beams) to request from the network entity based on actual coverage area, a number of served UEs in the coverage area, a number of utilized random access resources, or the like. Based on the updated (e.g., more accurate) requested number of beams, the network entity 105 may transmit an updated number of SSBs to the repeater 210 for relaying to the UEs 115.

Figure 3:
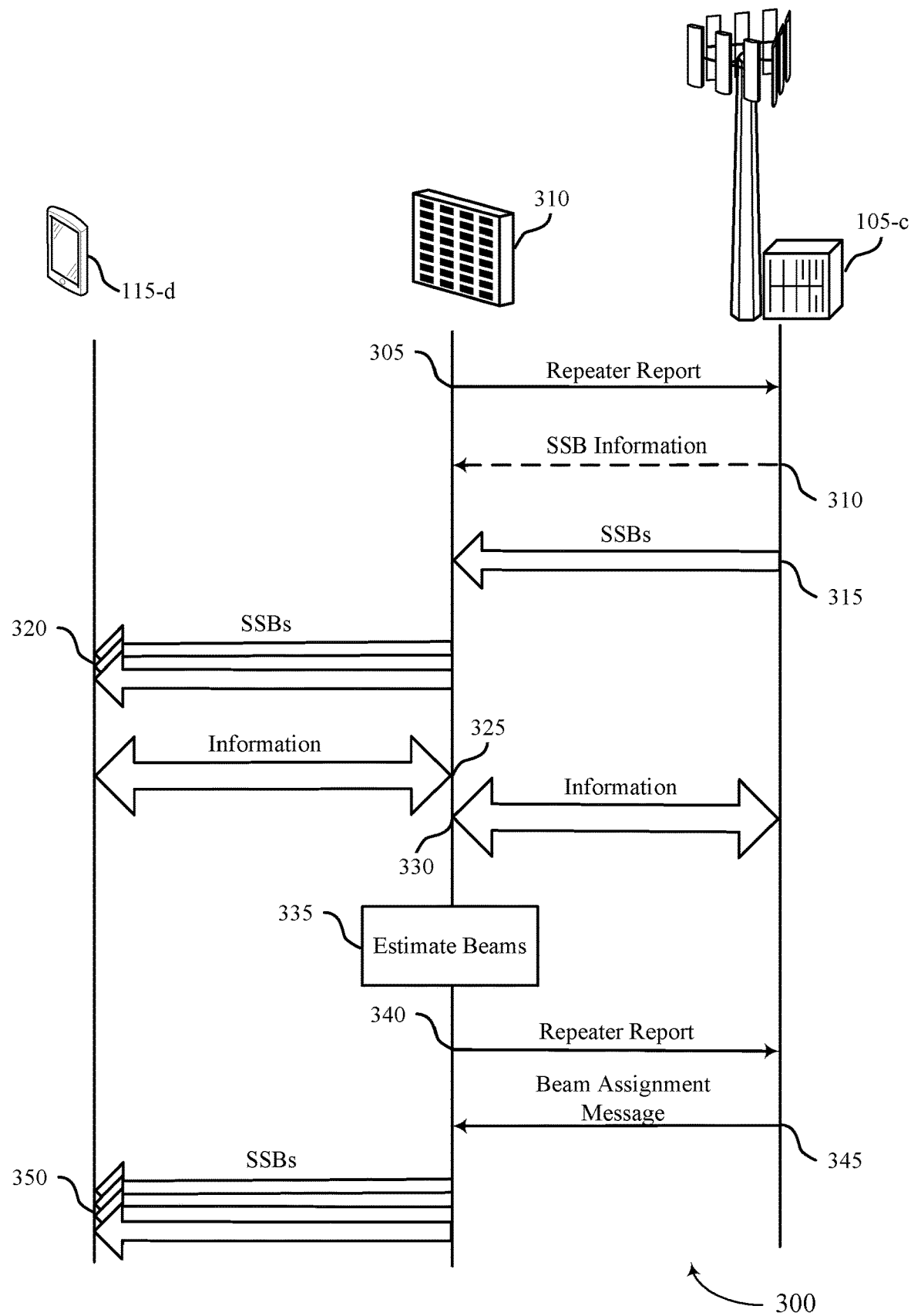
FIG. 3 illustrates an example of a process flow diagram that supports repeater beam requests for transparent beam management in accordance with one or more aspects of the present disclosure.

FIG. 3 illustrates an example of a process flow diagram 300 that supports repeater beam requests for transparent beam management in accordance with one or more aspects of the present disclosure. The UE 115-*d* may be an example of a UE 115 as described with reference to FIGS. 1-2. The repeater 310 may be an example of a repeater 185 or a repeater 210 as described with reference to FIGS. 1-2. The network entity 105-*c* may be an example of network entity 105 as described with reference to FIGS. 1-2.

At 305, the repeater 310 may establish connection with the network entity 105-*c*, and may transmit a repeater report, or capability report. The repeater report may include an indication of a latency capability and a quantity of beams supported by the repeater. For example, the repeater report may include, in the report, an indication of the capability of the repeater 310 to relay a signal according to a threshold latency (e.g., less than the CP length). In some examples, the repeater report may include, in the report, a threshold number of beams (e.g., a maximum number of beams) the repeater 310 may receive or transmit. The indication of the threshold number of beams may be based on one or more conditions or parameter values, such as hardware limitations or capabilities at the repeater 310, or coverage limitations (e.g., a size of a geographic coverage area, which may be a small area).

At repeater 310, the network entity 105-*c* may transmit, and the repeater 310 may receive, an indication of a set of SSB indices. The repeater 310 may determine, based at least in part on the indication of the set of SSB indices, a time occasion for receiving each SSB of a set of one or more SSBs.

At 315, the network entity 105-*c* may transmit, and the repeater 310 may receive, one or more SSBs via a first beam, each SSB of the one or more SSBs corresponding to a respective SSB index (e.g., the SSB indices indicated at repeater 310). IN some examples, a quantity of the one or more SSBs may satisfy (e.g., may be fewer than or equal to) the quantity of beams supported by the repeater 310. For example, the network entity 105-*c* may transmit multiple SSBs using a single beam (e.g., in a single direction) toward a repeater 310. Each SSB may be associated with a different SSB index for transparent beam management. In some examples, the UE 115-*d* may communicate directly with the network (via the repeater 310) but without establishing an independent communication link with the repeater 310 (e.g., without any recognition that the repeater is present, or part of the communication link).

At 320, the repeater 310 may relay the one or more SSBs via a first set of beams associated with a coverage area served by the repeater 310. In some examples, the repeater 310 may relay the SSB beams in different spatial directions according to a beam management algorithm. The repeater 310 may relay the SSB beams to one or more UEs 115 (e.g., including the UE 115-*d*). The beam management algorithm may improve coverage for the deployed area.

At 325, the repeater 310 may receive and transmit information from the UE 115-*d*. At 330, the network entity 105-*c* may receive and transmit information from the repeater 310. Thus, the repeater 310 may relay, based at least in part on relaying the one or more SSBs, signaling from a network entity 105-*c* to one or more UEs 115 served by the repeater 310, and signaling from the one or more UEs 115 (e.g., including the UE 115-*d*) to the network entity 105-*c*. Relaying may include receiving random access messages associated with respective SSB indices of the one or more SSBs from the one or more UEs 115 (e.g., including the UE 115-*d*) using the first set of beams, and relaying the received random access messages to the network entity 105-*c* (e.g., using the first beam). The repeater 310 may also relay data from and to the network entity 105-*c*. The relayed information may include control signaling and data signaling from and to the UE 115-*d*.

At 335, the repeater 310 may estimate a quantity of beams (e.g., an updated number of beams) to use for subsequent communications with the network entity 105-*c*. For example, the repeater 310 may indicate a threshold number of beams that the repeater 310 supports at 305, but may determine that the repeater 310 can use fewer beams (e.g., based on a small coverage area, or a limited number of UEs within the coverage area, etc.). For example, the repeater 310 may estimate a quantity of beams in a second set of beams (e.g., different than a first set of beams used to relay the SSBs at 320) based at least in part on a number of random access occasions associated with random access messages relayed by the repeater 310 from the one or more UEs 115 to a network entity 105-c, a quantity of UEs 115 located in the coverage area served by the repeater 310, a spatial separation between respective beams of the first set of beams, or a combination thereof. In some examples, the estimated quantity of beams may be a preferred or supported number of beams based on previous communications, or other conditions. In some examples, repeater 310 may estimate the quantity of beams in the second set of beams based on a size of a served or captured area. The size of the captured coverage area may be determined based on dedicated sensing hardware or sensors at the repeater 310, may be preconfigured by the installer, may be based on a history of active UEs 115 and respective locations of the UEs 115, transmitted SSB receptions, or any combination thereof. In some examples, the repeater 310 may estimate the quantity of beams in the second set of beams based on a spatial separation between beams (e.g., which may define a threshold signal to interference noise ratio (SINR) of each UE 115, and may be based at least in part on the radio frequency architecture, an angle of departure of the desired beams, or a combination thereof.

At 340, the repeater 310 may transmit, and the network entity 105-c may receive, based at least in part on relaying the one or more SSBs via the first set of beams, a repeater report (e.g., a beam report) comprising an indication of the second set of beams associated with service to one or more UEs 115 located in the coverage area served by the repeater 310. The repeater 310 may request (e.g., in the repeater report at 340) a quantity of beams for the second set of beams estimated at 335. The repeater report may include a request for the second set of beams, a periodicity of the second set of beams, a threshold time between duplicate beams of the first set of beams, the number of beams, or the minimal or maximal time between duplicate beams, or a combination thereof. The repeater report may be based on RRC or MAC CE messages (e.g., in examples where the report changes slowly).

At 345, the network entity 105-c may transmit, and the repeater 310 may receive, based at least in part on transmitting the repeater report, a beam assignment message including beam information for the second set of beams. In some examples, the beam assignment message may include an indication of a quantity of beams of the second set of beams, an indication of a beam direction for each beam of the second set of beams, or a combination thereof, wherein the second set of beams is different from the first set of beams. The beam assignment message may update the repeater 310 with the number of beams and the direction of each beam. In some examples, one or more beams may have the same angle-of-arrival (AOA). In some other examples, the quantity of the first set of beams and the quantity of the second set of beams may be the same quantity, and the network entity 105-c may signal a beam assignment message comprising a one-bit message indicating that the second set of beams is the same as the first set of beams.

At 350, the repeater 310 may receive a second set of one or more SSBs via the first beam, each SSB of the second set of one or more SSBs corresponding to a respective SSB index, and a quantity of the second set of one or more SSBs may satisfy the second set of beams, and relay the set of one or more SSBs via the second set of beams. The repeater 310 may transmit the number of beams as configured by the network entity 105-c.

Figure 4:
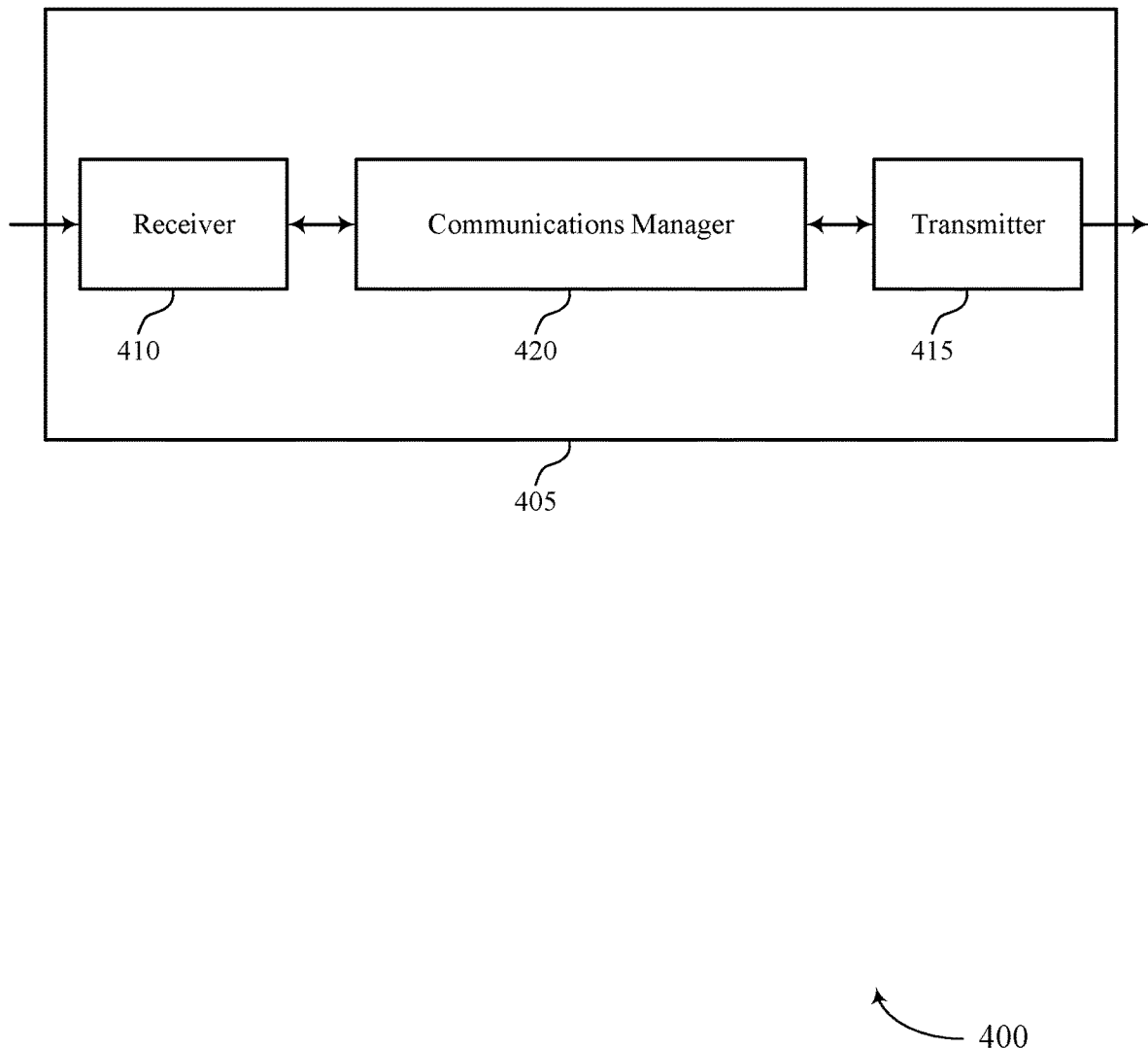
FIGS. 4 and 5 show block diagrams of devices that support repeater beam requests for transparent beam management in accordance with one or more aspects of the present disclosure.

FIG. 4 shows a block diagram 400 of a device 405 that supports repeater beam requests for transparent beam management in accordance with one or more aspects of the present disclosure. The device 405 may be an example of aspects of a repeater (e.g., a repeater 185, a repeater 210, or a repeater 310) as described herein. The device 405 may include a receiver 410, a transmitter 415, and a communications manager 420. The device 405 may also include a processor. Each of these components may be in communication with one another (e.g., via one or more buses).

The receiver 410 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 405. In some examples, the receiver 410 may support obtaining information by receiving signals via one or more antennas. Additionally, or alternatively, the receiver 410 may support obtaining information by receiving signals via one or more wired (e.g., electrical, fiber optic) interfaces, wireless interfaces, or any combination thereof.

The transmitter 415 may provide a means for outputting (e.g., transmitting, providing, conveying, sending) information generated by other components of the device 405. For example, the transmitter 415 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 415 may support outputting information by transmitting signals via one or more antennas. Additionally, or alternatively, the transmitter 415 may support outputting information by transmitting signals via one or more wired (e.g., electrical, fiber optic) interfaces, wireless interfaces, or any combination thereof. In some examples, the transmitter 415 and the receiver 410 may be co-located in a transceiver, which may include or be coupled with a modem.

The communications manager 420, the receiver 410, the transmitter 415, or various combinations thereof or various components thereof may be examples of means for performing various aspects of repeater beam requests for transparent beam management as described herein. For example, the communications manager 420, the receiver 410, the transmitter 415, or various combinations or components thereof may support a method for performing one or more of the functions described herein.

In some examples, the communications manager 420, the receiver 410, the transmitter 415, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 420, the receiver 410, the transmitter 415, or various combinations or components thereof may be implemented in code (e.g., as communications management software or firmware) executed by a processor. If implemented in code executed by a processor, the functions of the communications manager 420, the receiver 410, the transmitter 415, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 420 may be configured to perform various operations (e.g., receiving, obtaining, monitoring, outputting, transmitting) using or otherwise in cooperation with the receiver 410, the transmitter 415, or both. For example, the communications manager 420 may receive information from the receiver 410, send information to the transmitter 415, or be integrated in combination with the receiver 410, the transmitter 415, or both to obtain information, output information, or perform various other operations as described herein.

The communications manager 420 may support wireless communications at a repeater in accordance with examples as disclosed herein. For example, the communications manager 420 may be configured as or otherwise support a means for transmitting a capability report including an indication of a latency capability and a quantity of beams supported by the repeater. The communications manager 420 may be configured as or otherwise support a means for receiving a set of multiple SSBs via a first beam, each SSB of the set of multiple SSBs corresponding to a respective SSB index, where a quantity of the set of multiple SSBs satisfies the quantity of beams supported by the repeater. The communications manager 420 may be configured as or otherwise support a means for relaying the set of multiple SSBs via a first set of beams associated with a coverage area served by the repeater. The communications manager 420 may be configured as or otherwise support a means for transmitting, based on relaying the set of multiple SSBs via the first set of beams, a repeater report including an indication of a second set of beams associated with service to one or more UEs located in the coverage area served by the repeater.

By including or configuring the communications manager 420 in accordance with examples as described herein, the device 405 (e.g., a processor controlling or otherwise coupled with the receiver 410, the transmitter 415, the communications manager 420, or a combination thereof) may support techniques for transparent beamforming procedures resulting in reduced processing, reduced power consumption, more efficient utilization of communication resources, etc.

Figure 5:
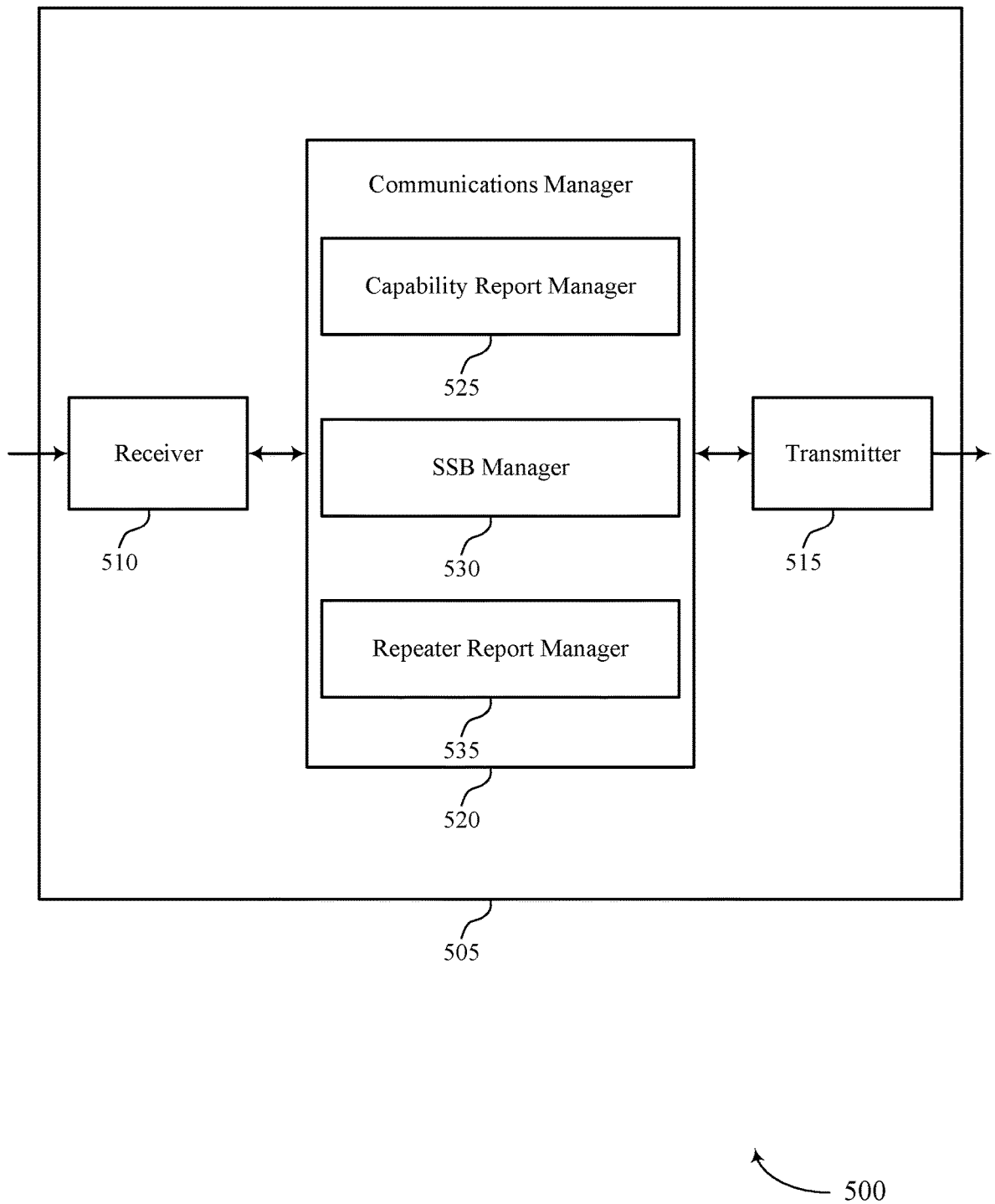

FIG. 5 shows a block diagram 500 of a device 505 that supports repeater beam requests for transparent beam management in accordance with one or more aspects of the present disclosure. The device 505 may be an example of aspects of a device 405 or a repeater (e.g., a repeater 185, a 210, or a repeater 310) as described herein. The device 505 may include a receiver 510, a transmitter 515, and a communications manager 520. The device 505 may also include a processor. Each of these components may be in communication with one another (e.g., via one or more buses).

The receiver 510 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 505. In some examples, the receiver 510 may support obtaining information by receiving signals via one or more antennas. Additionally, or alternatively, the receiver 510 may support obtaining information by receiving signals via one or more wired (e.g., electrical, fiber optic) interfaces, wireless interfaces, or any combination thereof.

The transmitter 515 may provide a means for outputting (e.g., transmitting, providing, conveying, sending) information generated by other components of the device 505. For example, the transmitter 515 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 515 may support outputting information by transmitting signals via one or more antennas. Additionally, or alternatively, the transmitter 515 may support outputting information by transmitting signals via one or more wired (e.g., electrical, fiber optic) interfaces, wireless interfaces, or any combination thereof. In some examples, the transmitter 515 and the receiver 510 may be co-located in a transceiver, which may include or be coupled with a modem.

The device 505, or various components thereof, may be an example of means for performing various aspects of repeater beam requests for transparent beam management as described herein. For example, the communications manager 520 may include a capability report manager 525, an SSB manager 530, a repeater report manager 535, or any combination thereof. The communications manager 520 may be an example of aspects of a communications manager 420 as described herein. In some examples, the communications manager 520, or various components thereof, may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communications at a repeater in accordance with examples as disclosed herein. The capability report manager 525 may be configured as or otherwise support a means for transmitting a capability report including an indication of a latency capability and a quantity of beams supported by the repeater. The SSB manager 530 may be configured as or otherwise support a means for receiving a set of multiple SSBs via a first beam, each SSB of the set of multiple SSBs corresponding to a respective SSB index, where a quantity of the set of multiple SSBs satisfies the quantity of beams supported by the repeater. The SSB manager 530 may be configured as or otherwise support a means for relaying the set of multiple SSBs via a first set of beams associated with a coverage area served by the repeater. The repeater report manager 535 may be configured as or otherwise support a means for transmitting, based on relaying the set of multiple SSBs via the first set of beams, a repeater report including an indication of a second set of beams associated with service to one or more UEs located in the coverage area served by the repeater.

Figure 6:
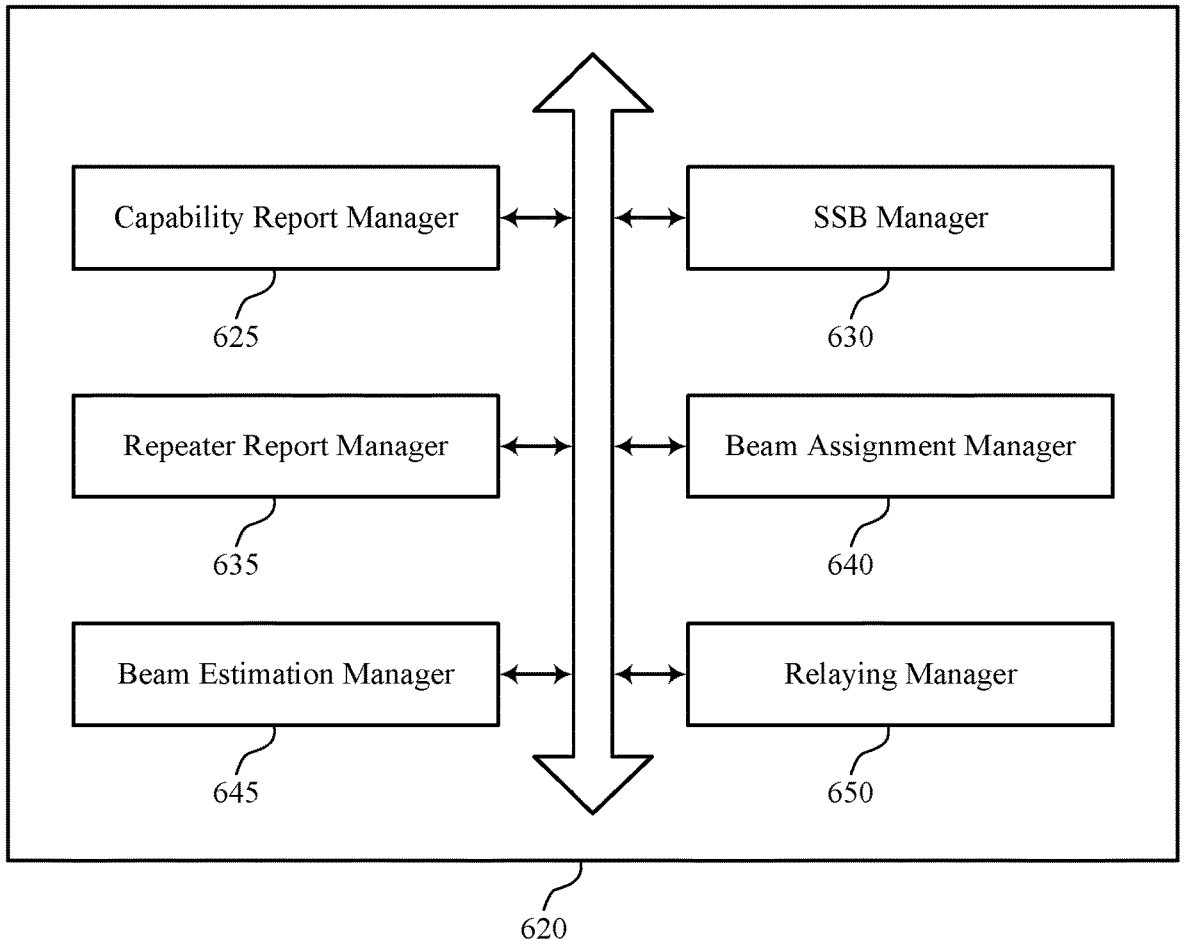
FIG. 6 shows a block diagram of a communications manager that supports repeater beam requests for transparent beam management in accordance with one or more aspects of the present disclosure.

FIG. 6 shows a block diagram 600 of a communications manager 620 that supports repeater beam requests for transparent beam management in accordance with one or more aspects of the present disclosure. The communications manager 620 may be an example of aspects of a communications manager 420, a communications manager 520, or both, as described herein. The communications manager 620, or various components thereof, may be an example of means for performing various aspects of repeater beam requests for transparent beam management as described herein. For example, the communications manager 620 may include a capability report manager 625, an SSB manager 630, a repeater report manager 635, a beam assignment manager 640, a beam estimation manager 645, a relaying manager 650, or any combination thereof. Each of these components may communicate, directly or indirectly, with one another (e.g., via one or more buses).

The communications manager 620 may support wireless communications at a repeater in accordance with examples as disclosed herein. The capability report manager 625 may be configured as or otherwise support a means for transmitting a capability report including an indication of a latency capability and a quantity of beams supported by the repeater. The SSB manager 630 may be configured as or otherwise support a means for receiving a set of multiple SSBs via a first beam, each SSB of the set of multiple SSBs corresponding to a respective SSB index, where a quantity of the set of multiple SSBs satisfies the quantity of beams supported by the repeater. In some examples, the SSB manager 630 may be configured as or otherwise support a means for relaying the set of multiple SSBs via a first set of beams associated with a coverage area served by the repeater. The repeater report manager 635 may be configured as or otherwise support a means for transmitting, based on relaying the set of multiple SSBs via the first set of beams, a repeater report including an indication of a second set of beams associated with service to one or more UEs located in the coverage area served by the repeater.

In some examples, the beam assignment manager 640 may be configured as or otherwise support a means for receiving, based on transmitting the repeater report, a beam assignment message including beam information for the second set of beams.

In some examples, to support beam assignment message, the beam assignment manager 640 may be configured as or otherwise support a means for an indication of a quantity of beams of the second set of beams, an indication of a beam direction for each beam of the second set of beams, or a combination thereof, where the second set of beams is different from the first set of beams.

In some examples, to support beam assignment message, the beam assignment manager 640 may be configured as or otherwise support a means for a one-bit message indicating that the second set of beams is the same as the first set of beams.

In some examples, the SSB manager 630 may be configured as or otherwise support a means for receiving a second set of multiple SSBs via the first beam, each SSB of the second set of multiple SSBs corresponding to a respective SSB index, where a quantity of the second set of multiple SSBs satisfies the second set of beams. In some examples, the SSB manager 630 may be configured as or otherwise support a means for relaying the second set of multiple SSBs via the second set of beams.

In some examples, to support repeater report, the repeater report manager 635 may be configured as or otherwise support a means for a quantity of beams of the second set of beams, a periodicity of the second set of beams, a threshold time between duplicate beams of the first set of beams, or a combination thereof.

In some examples, the beam estimation manager 645 may be configured as or otherwise support a means for estimating a quantity of beams of the second set of beams based on a number of random access occasions associated with random access messages relayed by the repeater from the one or more UEs to a network entity, a quantity of UEs located in the coverage area served by the repeater, a spatial separation between respective beams of the first set of beams, or a combination thereof, where transmitting the repeater report is based on the estimating.

In some examples, the beam estimation manager 645 may be configured as or otherwise support a means for determining a size of the coverage area served by the repeater based on one or more sensors, a preconfigured area input by a user, a history of locations of the one or more UEs served by the repeater, a quantity of messages received from the one or more UEs based on relaying the set of multiple SSBs, or a combination thereof. In some examples, the beam estimation manager 645 may be configured as or otherwise support a means for estimating a quantity of beams of the second set of beams based on the size of the coverage area served by the repeater, where transmitting the repeater report is based on the estimating.

In some examples, the relaying manager 650 may be configured as or otherwise support a means for relaying, based on relaying the set of multiple SSBs, signaling from a network entity to one or more UEs served by the repeater, and signaling from the one or more UEs to the network entity.

In some examples, to support relaying, the relaying manager 650 may be configured as or otherwise support a means for receiving random access messages associated with respective SSB indices of the set of multiple SSBs from the one or more UEs using the first set of beams. In some examples, to support relaying, the relaying manager 650 may be configured as or otherwise support a means for relaying the received random access messages to the network entity using the first beam.

In some examples, the SSB manager 630 may be configured as or otherwise support a means for receiving, from a network entity, an indication of a set of SSB indices including each respective SSB index corresponding to each SSB of the set of multiple SSBs. In some examples, the SSB manager 630 may be configured as or otherwise support a means for determining, based on the indication of the set of SSB indices, a time occasion for receiving each SSB of the set of multiple SSBs, where receiving the set of multiple SSBs is based on the determining.

Figure 7:
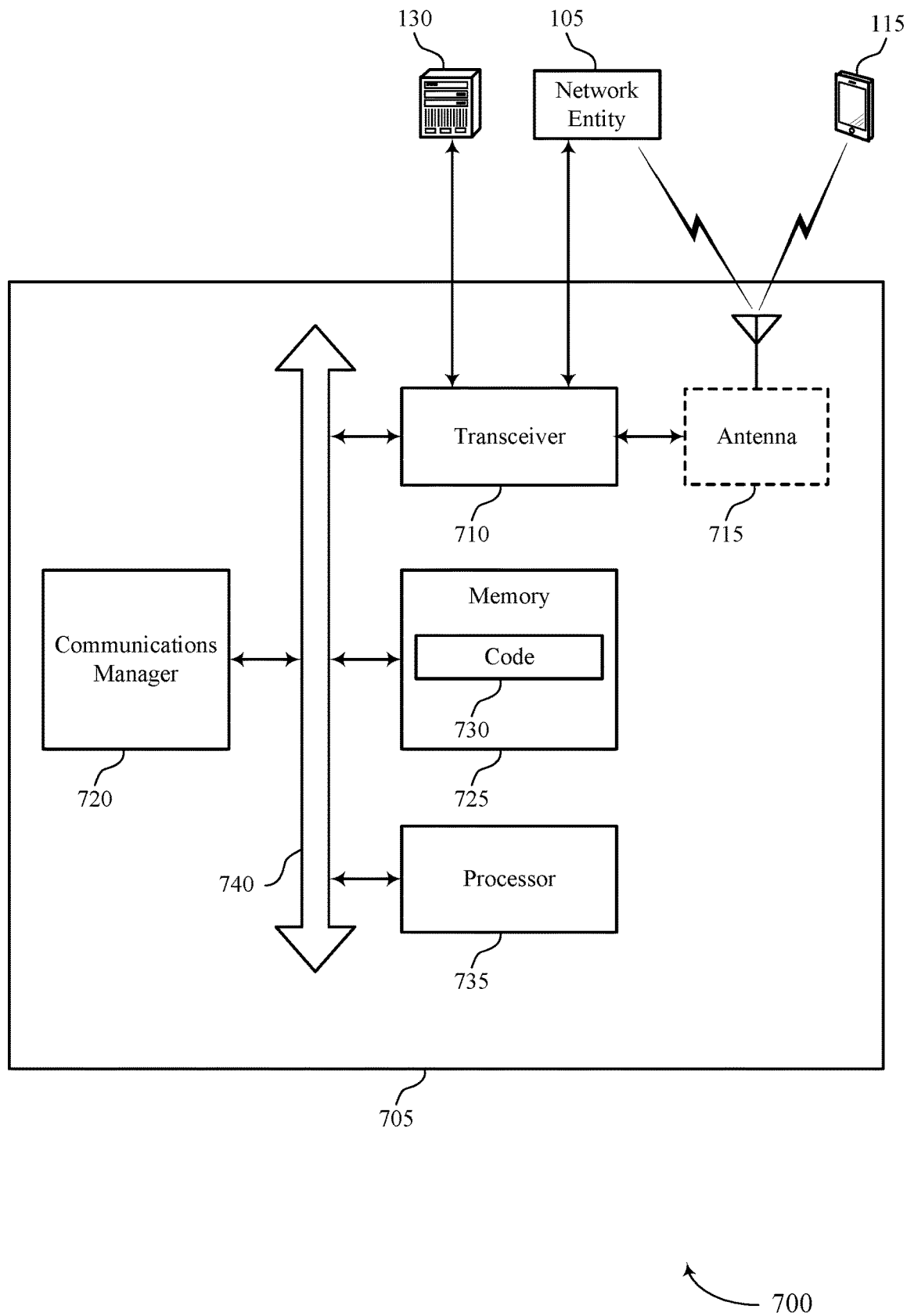
FIG. 7 shows a diagram of a system including a device that supports repeater beam requests for transparent beam management in accordance with one or more aspects of the present disclosure.

FIG. 7 shows a diagram of a system 700 including a device 705 that supports repeater beam requests for transparent beam management in accordance with one or more aspects of the present disclosure. The device 705 may be an example of or include the components of a device 405, a device 505, or a repeater (e.g., a repeater 185, a repeater 210, or a repeater 310) as described herein. The device 705 may include components for bi-directional voice and data communications including components for transmitting and receiving communications, such as a communications manager 720, a transceiver 710, an antenna 715, a memory 725, code 730, and a processor 735. These components may be in electronic communication or otherwise coupled (e.g., operatively, communicatively, functionally, electronically, electrically) via one or more buses (e.g., a bus 740).

The transceiver 710 may support bi-directional communications via wired links, wireless links, or both as described herein. In some examples, the transceiver 710 may include a wired transceiver and may communicate bi-directionally with another wired transceiver. Additionally, or alternatively, in some examples, the transceiver 710 may include a wireless transceiver and may communicate bi-directionally with another wireless transceiver. In some examples, the device 705 may include one or more antennas 715, which may be capable of transmitting or receiving wireless transmissions (e.g., concurrently). The transceiver 710 may also include a modem to modulate signals, to provide the modulated signals for transmission (e.g., by one or more antennas 715, by a wired transmitter), to receive modulated signals (e.g., from one or more antennas 715, from a wired receiver), and to demodulate signals. The transceiver 710, or the transceiver 710 and one or more antennas 715 or wired interfaces, where applicable, may be an example of a transmitter 415, a transmitter 515, a receiver 410, a receiver 510, or any combination thereof or component thereof, as described herein. In some examples, the transceiver may be operable to support communications via one or more communications links (e.g., a communication link 125, a backhaul communication link 120, a midhaul communication link 162, a fronthaul communication link 168).

The memory 725 may include RAM and ROM. The memory 725 may store computer-readable, computer-executable code 730 including instructions that, when executed by the processor 735, cause the device 705 to perform various functions described herein. The code 730 may be stored in a non-transitory computer-readable medium such as system memory or another type of memory. In some cases, the code 730 may not be directly executable by the processor 735 but may cause a computer (e.g., when compiled and executed) to perform functions described herein. In some cases, the memory 725 may contain, among other things, a BIOS which may control basic hardware or software operation such as the interaction with peripheral components or devices.

The processor 735 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 735 may be configured to operate a memory array using a memory controller. In some other cases, a memory controller may be integrated into the processor 735. The processor 735 may be configured to execute computer-readable instructions stored in a memory (e.g., the memory 725) to cause the device 705 to perform various functions (e.g., functions or tasks supporting repeater beam requests for transparent beam management). For example, the device 705 or a component of the device 705 may include a processor 735 and memory 725 coupled with the processor 735, the processor 735 and memory 725 configured to perform various functions described herein. The processor 735 may be an example of a cloud-computing platform (e.g., one or more physical nodes and supporting software such as operating systems, virtual machines, or container instances) that may host the functions (e.g., by executing code 730) to perform the functions of the device 705.

In some examples, a bus 740 may support communications of (e.g., within) a protocol layer of a protocol stack. In some examples, a bus 740 may support communications associated with a logical channel of a protocol stack (e.g., between protocol layers of a protocol stack), which may include communications performed within a component of the device 705, or between different components of the device 705 that may be co-located or located in different locations (e.g., where the device 705 may refer to a system in which one or more of the communications manager 720, the transceiver 710, the memory 725, the code 730, and the processor 735 may be located in one of the different components or divided between different components).

In some examples, the communications manager 720 may manage aspects of communications with a core network 130 (e.g., via one or more wired or wireless backhaul links). For example, the communications manager 720 may manage the transfer of data communications for client devices, such as one or more UEs 115. In some examples, the communications manager 720 may manage communications with other network entities 105, and may include a controller or scheduler for controlling communications with UEs 115 in cooperation with other network entities 105. In some examples, the communications manager 720 may support an X2 interface within an LTE/LTE-A wireless communications network technology to provide communication between network entities 105.

The communications manager 720 may support wireless communications at a repeater in accordance with examples as disclosed herein. For example, the communications manager 720 may be configured as or otherwise support a means for transmitting a capability report including an indication of a latency capability and a quantity of beams supported by the repeater. The communications manager 720 may be configured as or otherwise support a means for receiving a set of multiple SSBs via a first beam, each SSB of the set of multiple SSBs corresponding to a respective SSB index, where a quantity of the set of multiple SSBs satisfies the quantity of beams supported by the repeater. The communications manager 720 may be configured as or otherwise support a means for relaying the set of multiple SSBs via a first set of beams associated with a coverage area served by the repeater. The communications manager 720 may be configured as or otherwise support a means for transmitting, based on relaying the set of multiple SSBs via the first set of beams, a repeater report including an indication of a second set of beams associated with service to one or more UEs located in the coverage area served by the repeater.

By including or configuring the communications manager 720 in accordance with examples as described herein, the device 705 may support techniques for transparent beamforming procedures resulting in improved communication reliability, reduced latency, improved user experience related to reduced processing, reduced power consumption, more efficient utilization of communication resources, improved coordination between devices, longer battery life, improved utilization of processing capability, etc.

In some examples, the communications manager 720 may be configured to perform various operations (e.g., receiving, obtaining, monitoring, outputting, transmitting) using or otherwise in cooperation with the transceiver 710, the one or more antennas 715 (e.g., where applicable), or any combination thereof. Although the communications manager 720 is illustrated as a separate component, in some examples, one or more functions described with reference to the communications manager 720 may be supported by or performed by the processor 735, the memory 725, the code 730, the transceiver 710, or any combination thereof. For example, the code 730 may include instructions executable by the processor 735 to cause the device 705 to perform various aspects of repeater beam requests for transparent beam management as described herein, or the processor 735 and the memory 725 may be otherwise configured to perform or support such operations.

Figure 8:
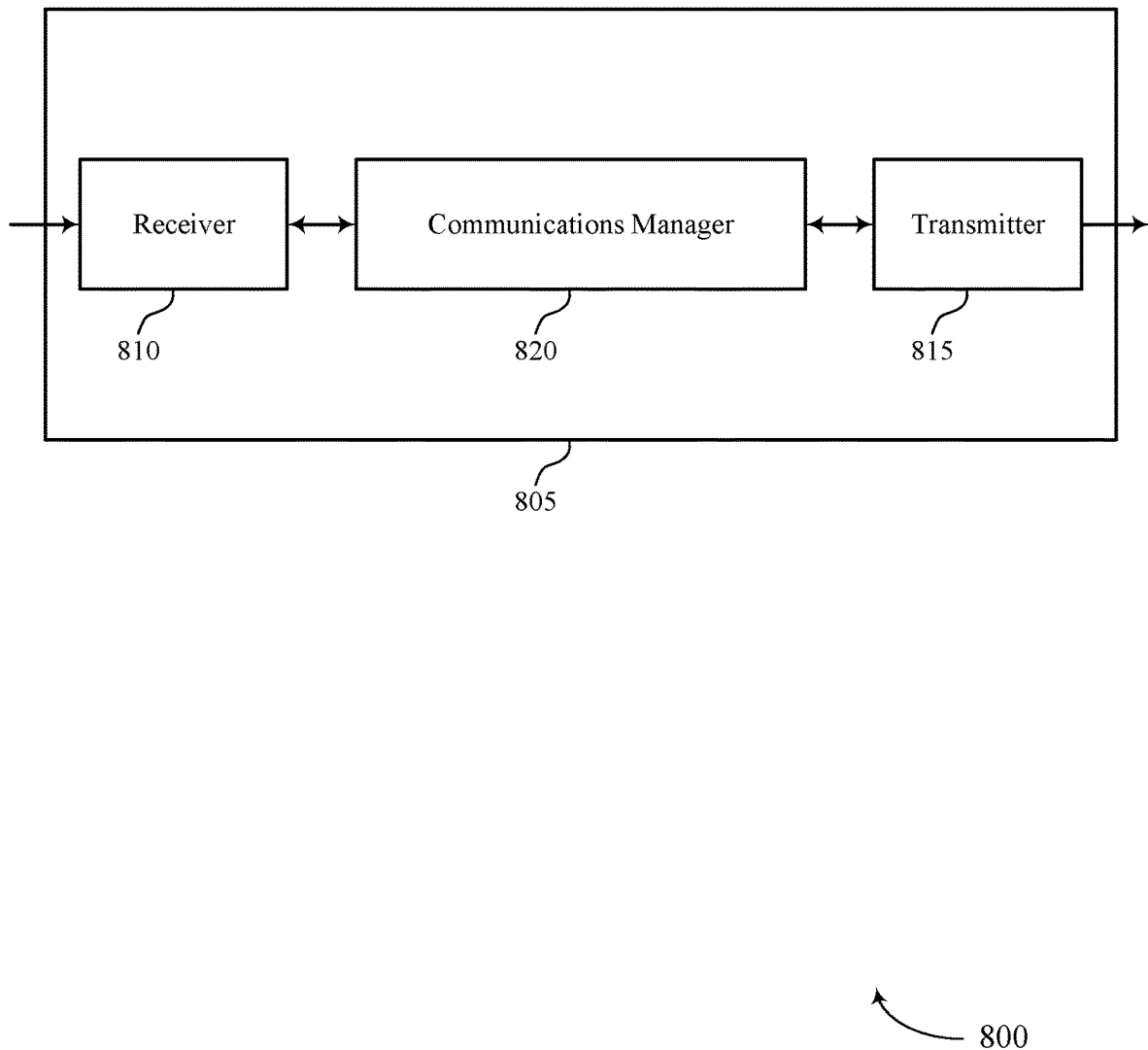
FIGS. 8 and 9 show block diagrams of devices that support repeater beam requests for transparent beam management in accordance with one or more aspects of the present disclosure.

FIG. 8 shows a block diagram 800 of a device 805 that supports repeater beam requests for transparent beam management in accordance with one or more aspects of the present disclosure. The device 805 may be an example of aspects of a network entity 105 as described herein. The device 805 may include a receiver 810, a transmitter 815, and a communications manager 820. The device 805 may also include a processor. Each of these components may be in communication with one another (e.g., via one or more buses).

The receiver 810 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 805. In some examples, the receiver 810 may support obtaining information by receiving signals via one or more antennas. Additionally, or alternatively, the receiver 810 may support obtaining information by receiving signals via one or more wired (e.g., electrical, fiber optic) interfaces, wireless interfaces, or any combination thereof.

The transmitter 815 may provide a means for outputting (e.g., transmitting, providing, conveying, sending) information generated by other components of the device 805. For example, the transmitter 815 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 815 may support outputting information by transmitting signals via one or more antennas. Additionally, or alternatively, the transmitter 815 may support outputting information by transmitting signals via one or more wired (e.g., electrical, fiber optic) interfaces, wireless interfaces, or any combination thereof. In some examples, the transmitter 815 and the receiver 810 may be co-located in a transceiver, which may include or be coupled with a modem.

The communications manager 820, the receiver 810, the transmitter 815, or various combinations thereof or various components thereof may be examples of means for performing various aspects of repeater beam requests for transparent beam management as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 820, the receiver 810, the transmitter 815, or various combinations or components thereof may be implemented in code (e.g., as communications management software or firmware) executed by a processor. If implemented in code executed by a processor, the functions of the communications manager 820, the receiver 810, the transmitter 815, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 820 may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support wireless communications at a network entity in accordance with examples as disclosed herein. For example, the communications manager 820 may be configured as or otherwise support a means for obtaining a capability report including an indication of a latency capability and a quantity of beams supported by a repeater. The communications manager 820 may be configured as or otherwise support a means for outputting a set of multiple SSBs via a first beam, each SSB of the set of multiple SSBs corresponding to a respective SSB index, where a quantity of the set of multiple SSBs correspond to a quantity of beams of a first set of beams that satisfies the quantity of beams supported by the repeater. The communications manager 820 may be configured as or otherwise support a means for obtaining, via the repeater, one or more uplink messages from one or more UEs served by the repeater based on outputting the set of multiple SSBs. The communications manager 820 may be configured as or otherwise support a means for obtaining a repeater report including an indication of a second set of beams associated with service, by the repeater, to one or more UEs located in a coverage area served by the repeater.

By including or configuring the communications manager 820 in accordance with examples as described herein, the device 805 (e.g., a processor controlling or otherwise coupled with the receiver 810, the transmitter 815, the communications manager 820, or a combination thereof) may support techniques for transparent beamforming procedures resulting in reduced processing, reduced power consumption, more efficient utilization of communication resources, etc.

Figure 9:
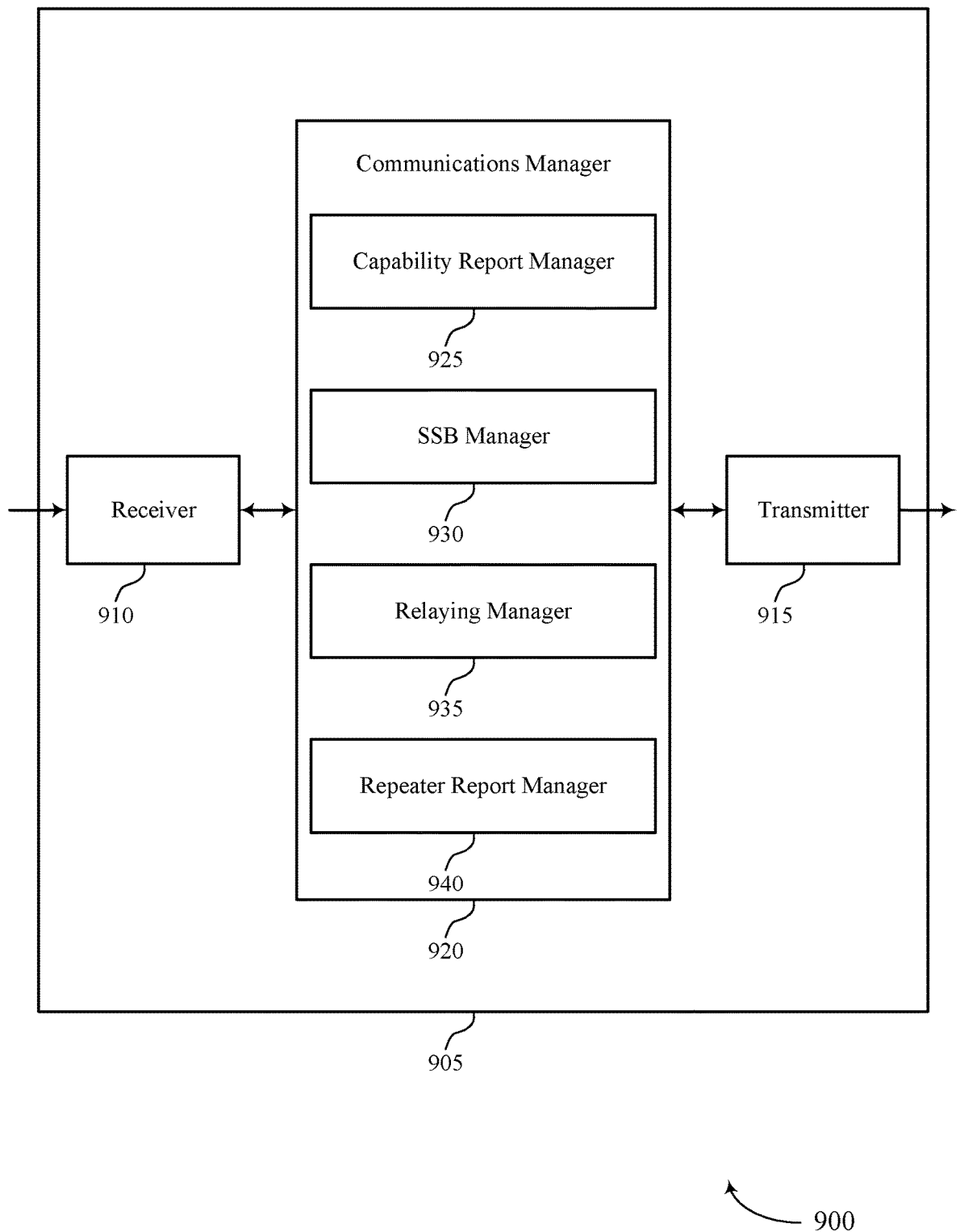

FIG. 9 shows a block diagram 900 of a device 905 that supports repeater beam requests for transparent beam management in accordance with one or more aspects of the present disclosure. The device 905 may be an example of aspects of a device 805 or a network entity 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 905. In some examples, the receiver 910 may support obtaining information by receiving signals via one or more antennas. Additionally, or alternatively, the receiver 910 may support obtaining information by receiving signals via one or more wired (e.g., electrical, fiber optic) interfaces, wireless interfaces, or any combination thereof.

The transmitter 915 may provide a means for outputting (e.g., transmitting, providing, conveying, sending) information generated by other components of the device 905. For example, the transmitter 915 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 915 may support outputting information by transmitting signals via one or more antennas. Additionally, or alternatively, the transmitter 915 may support outputting information by transmitting signals via one or more wired (e.g., electrical, fiber optic) interfaces, wireless interfaces, or any combination thereof. In some examples, the transmitter 915 and the receiver 910 may be co-located in a transceiver, which may include or be coupled with a modem.

The device 905, or various components thereof, may be an example of means for performing various aspects of repeater beam requests for transparent beam management as described herein. For example, the communications manager 920 may include a capability report manager 925, an SSB manager 930, a relaying manager 935, a repeater report manager 940, or any combination thereof. The communications manager 920 may be an example of aspects of a communications manager 820 as described herein. In some examples, the communications manager 920, or various components thereof, may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communications at a network entity in accordance with examples as disclosed herein. The capability report manager 925 may be configured as or otherwise support a means for obtaining a capability report including an indication of a latency capability and a quantity of beams supported by a repeater. The SSB manager 930 may be configured as or otherwise support a means for outputting a set of multiple SSBs via a first beam, each SSB of the set of multiple SSBs corresponding to a respective SSB index, where a quantity of the set of multiple SSBs correspond to a quantity of beams of a first set of beams that satisfies the quantity of beams supported by the repeater. The relaying manager 935 may be configured as or otherwise support a means for obtaining, via the repeater, one or more uplink messages from one or more UEs served by the repeater based on outputting the set of multiple SSBs. The repeater report manager 940 may be configured as or otherwise support a means for obtaining a repeater report including an indication of a second set of beams associated with service, by the repeater, to one or more UEs located in a coverage area served by the repeater.

Figure 10:
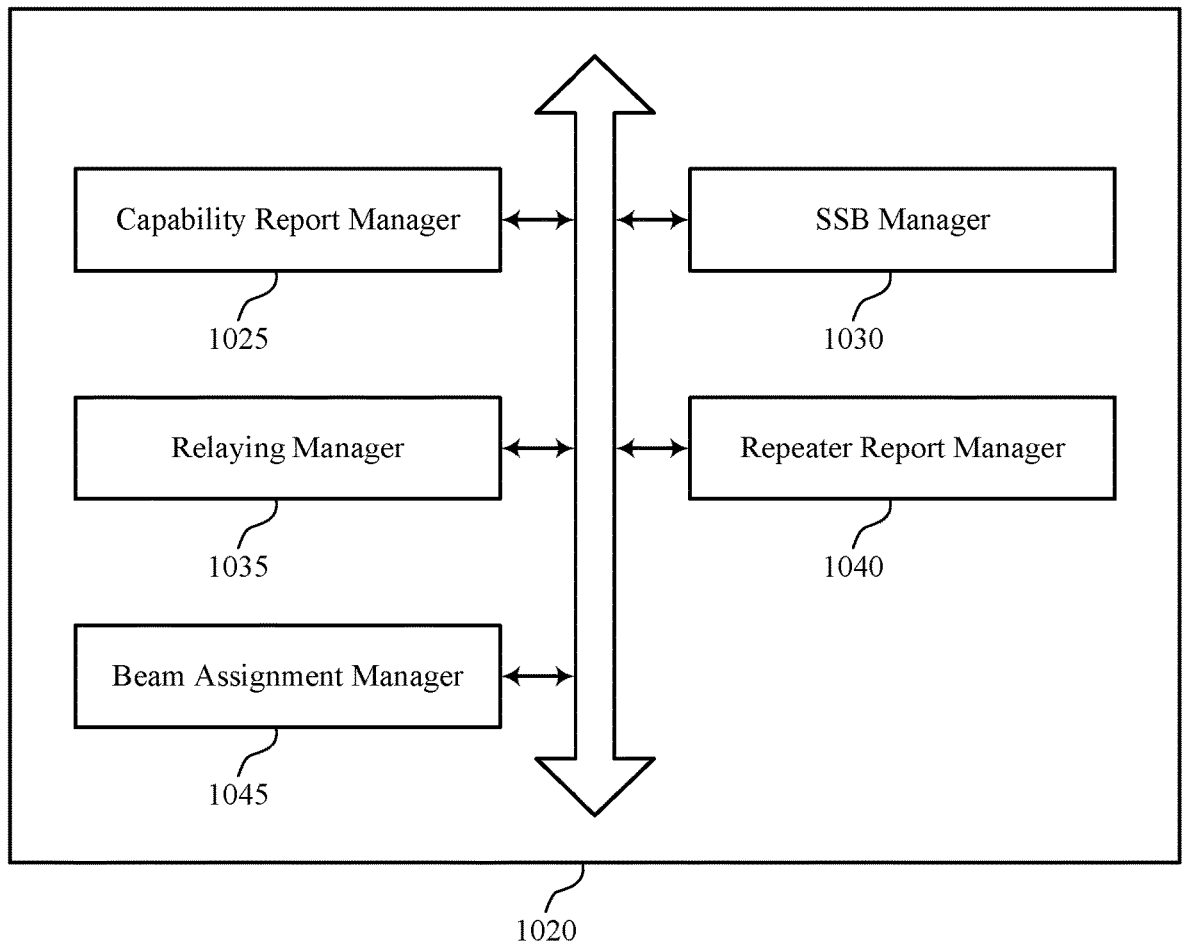
FIG. 10 shows a block diagram of a communications manager that supports repeater beam requests for transparent beam management in accordance with one or more aspects of the present disclosure.

FIG. 10 shows a block diagram 1000 of a communications manager 1020 that supports repeater beam requests for transparent beam management in accordance with one or more aspects of the present disclosure. The communications manager 1020 may be an example of aspects of a communications manager 820, a communications manager 920, or both, as described herein. The communications manager 1020, or various components thereof, may be an example of means for performing various aspects of repeater beam requests for transparent beam management as described herein. For example, the communications manager 1020 may include a capability report manager 1025, an SSB manager 1030, a relaying manager 1035, a repeater report manager 1040, a beam assignment manager 1045, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1020 may support wireless communications at a network entity in accordance with examples as disclosed herein. The capability report manager 1025 may be configured as or otherwise support a means for obtaining a capability report including an indication of a latency capability and a quantity of beams supported by a repeater. The SSB manager 1030 may be configured as or otherwise support a means for outputting a set of multiple SSBs via a first beam, each SSB of the set of multiple SSBs corresponding to a respective SSB index, where a quantity of the set of multiple SSBs correspond to a quantity of beams of a first set of beams that satisfies the quantity of beams supported by the repeater. The relaying manager 1035 may be configured as or otherwise support a means for obtaining, via the repeater, one or more uplink messages from one or more UEs served by the repeater based on outputting the set of multiple SSBs. The repeater report manager 1040 may be configured as or otherwise support a means for obtaining a repeater report including an indication of a second set of beams associated with service, by the repeater, to one or more UEs located in a coverage area served by the repeater.

In some examples, the beam assignment manager 1045 may be configured as or otherwise support a means for outputting, based on obtaining the repeater report, a beam assignment message including beam information for the second set of beams.

In some examples, to support beam assignment message, the beam assignment manager 1045 may be configured as or otherwise support a means for an indication of a quantity of beams of the second set of beams, an indication of a beam direction for each beam of the second set of beams, or a combination thereof, where the second set of beams is different from the first set of beams.

In some examples, to support beam assignment message, the beam assignment manager 1045 may be configured as or otherwise support a means for a one-bit message indicating that the second set of beams is the same as the first set of beams.

In some examples, the SSB manager 1030 may be configured as or otherwise support a means for outputting a second set of multiple SSBs via a second beam, each SSB of the second set of multiple SSBs corresponding to a respective SSB index, where a quantity of the second set of multiple SSBs satisfies the second set of beams.

In some examples, to support repeater report, the repeater report manager 1040 may be configured as or otherwise support a means for a quantity of beams of the second set of beams, a periodicity of the second set of beams, a threshold time between duplicate beams of the first set of beams, or a combination thereof.

In some examples, to support repeater report, the repeater report manager 1040 may be configured as or otherwise support a means for a quantity of beams of the second set of beams, a periodicity of the second set of beams, a threshold time between duplicate beams of the first set of beams, or a combination thereof.

In some examples, the SSB manager 1030 may be configured as or otherwise support a means for outputting an indication of a set of SSB indices including each respective SSB index corresponding to each SSB of the set of multiple SSBs, where outputting the set of multiple SSBs is based on the indication of the set of SSB indices.

Figure 11:
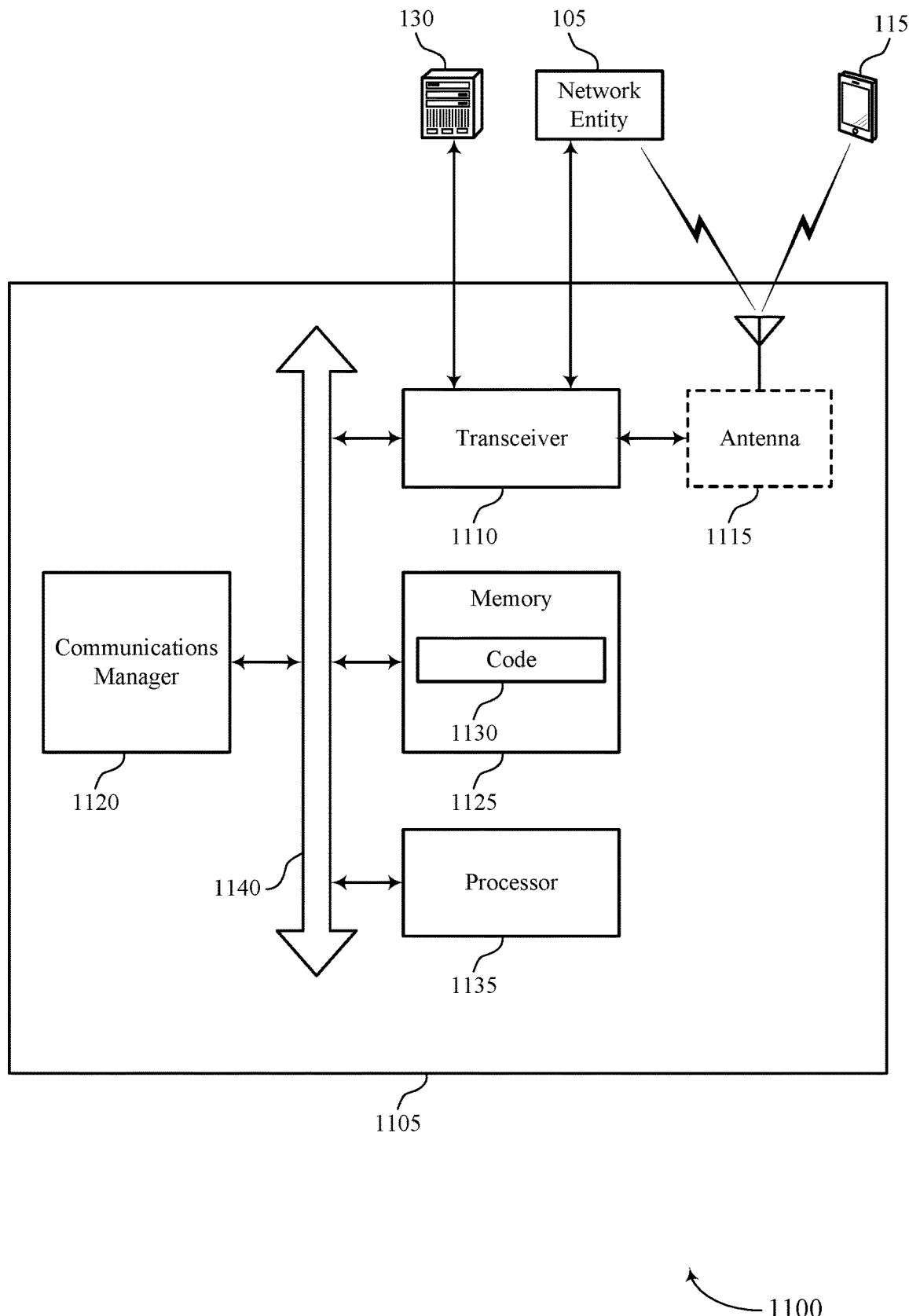
FIG. 11 shows a diagram of a system including a device that supports repeater beam requests for transparent beam management in accordance with one or more aspects of the present disclosure.

FIG. 11 shows a diagram of a system 1100 including a device 1105 that supports repeater beam requests for transparent beam management in accordance with one or more aspects of the present disclosure. The device 1105 may be an example of or include the components of a device 805, a device 905, or a network entity 105 as described herein. The device 1105 may communicate with one or more network entities 105, one or more UEs 115, or any combination thereof, which may include communications over one or more wired interfaces, over one or more wireless interfaces, or any combination thereof. The device 1105 may include components that support outputting and obtaining communications, such as a communications manager 1120, a transceiver 1110, an antenna 1115, a memory 1125, code 1130, and a processor 1135. These components may be in electronic communication or otherwise coupled (e.g., operatively, communicatively, functionally, electronically, electrically) via one or more buses (e.g., a bus 1140).

The transceiver 1110 may support bi-directional communications via wired links, wireless links, or both as described herein. In some examples, the transceiver 1110 may include a wired transceiver and may communicate bi-directionally with another wired transceiver. Additionally, or alternatively, in some examples, the transceiver 1110 may include a wireless transceiver and may communicate bi-directionally with another wireless transceiver. In some examples, the device 1105 may include one or more antennas 1115, which may be capable of transmitting or receiving wireless transmissions (e.g., concurrently). The transceiver 1110 may also include a modem to modulate signals, to provide the modulated signals for transmission (e.g., by one or more antennas 1115, by a wired transmitter), to receive modulated signals (e.g., from one or more antennas 1115, from a wired receiver), and to demodulate signals. The transceiver 1110, or the transceiver 1110 and one or more antennas 1115 or wired interfaces, where applicable, may be an example of a transmitter 815, a transmitter 915, a receiver 810, a receiver 910, or any combination thereof or component thereof, as described herein. In some examples, the transceiver may be operable to support communications via one or more communications links (e.g., a communication link 125, a backhaul communication link 120, a midhaul communication link 162, a fronthaul communication link 168).

The memory 1125 may include RAM and ROM. The memory 1125 may store computer-readable, computer-executable code 1130 including instructions that, when executed by the processor 1135, cause the device 1105 to perform various functions described herein. The code 1130 may be stored in a non-transitory computer-readable medium such as system memory or another type of memory. In some cases, the code 1130 may not be directly executable by the processor 1135 but may cause a computer (e.g., when compiled and executed) to perform functions described herein. In some cases, the memory 1125 may contain, among other things, a BIOS which may control basic hardware or software operation such as the interaction with peripheral components or devices.

The processor 1135 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1135 may be configured to operate a memory array using a memory controller. In some other cases, a memory controller may be integrated into the processor 1135. The processor 1135 may be configured to execute computer-readable instructions stored in a memory (e.g., the memory 1125) to cause the device 1105 to perform various functions (e.g., functions or tasks supporting repeater beam requests for transparent beam management). For example, the device 1105 or a component of the device 1105 may include a processor 1135 and memory 1125 coupled with the processor 1135, the processor 1135 and memory 1125 configured to perform various functions described herein. The processor 1135 may be an example of a cloud-computing platform (e.g., one or more physical nodes and supporting software such as operating systems, virtual machines, or container instances) that may host the functions (e.g., by executing code 1130) to perform the functions of the device 1105.

In some examples, a bus 1140 may support communications of (e.g., within) a protocol layer of a protocol stack. In some examples, a bus 1140 may support communications associated with a logical channel of a protocol stack (e.g., between protocol layers of a protocol stack), which may include communications performed within a component of the device 1105, or between different components of the device 1105 that may be co-located or located in different locations (e.g., where the device 1105 may refer to a system in which one or more of the communications manager 1120, the transceiver 1110, the memory 1125, the code 1130, and the processor 1135 may be located in one of the different components or divided between different components).

In some examples, the communications manager 1120 may manage aspects of communications with a core network 130 (e.g., via one or more wired or wireless backhaul links). For example, the communications manager 1120 may manage the transfer of data communications for client devices, such as one or more UEs 115. In some examples, the communications manager 1120 may manage communications with other network entities 105, and may include a controller or scheduler for controlling communications with UEs 115 in cooperation with other network entities 105. In some examples, the communications manager 1120 may support an X2 interface within an LTE/LTE-A wireless communications network technology to provide communication between network entities 105.

The communications manager 1120 may support wireless communications at a network entity in accordance with examples as disclosed herein. For example, the communications manager 1120 may be configured as or otherwise support a means for obtaining a capability report including an indication of a latency capability and a quantity of beams supported by a repeater. The communications manager 1120 may be configured as or otherwise support a means for outputting a set of multiple SSBs via a first beam, each SSB of the set of multiple SSBs corresponding to a respective SSB index, where a quantity of the set of multiple SSBs correspond to a quantity of beams of a first set of beams that satisfies the quantity of beams supported by the repeater. The communications manager 1120 may be configured as or otherwise support a means for obtaining, via the repeater, one or more uplink messages from one or more UEs served by the repeater based on outputting the set of multiple SSBs. The communications manager 1120 may be configured as or otherwise support a means for obtaining a repeater report including an indication of a second set of beams associated with service, by the repeater, to one or more UEs located in a coverage area served by the repeater.

By including or configuring the communications manager 1120 in accordance with examples as described herein, the device 1105 may support techniques for transparent beamforming procedures resulting in improved communication reliability, reduced latency, improved user experience related to reduced processing, reduced power consumption, more efficient utilization of communication resources, improved coordination between devices, longer battery life, improved utilization of processing capability, etc.

In some examples, the communications manager 1120 may be configured to perform various operations (e.g., receiving, obtaining, monitoring, outputting, transmitting) using or otherwise in cooperation with the transceiver 1110, the one or more antennas 1115 (e.g., where applicable), or any combination thereof. Although the communications manager 1120 is illustrated as a separate component, in some examples, one or more functions described with reference to the communications manager 1120 may be supported by or performed by the processor 1135, the memory 1125, the code 1130, the transceiver 1110, or any combination thereof. For example, the code 1130 may include instructions executable by the processor 1135 to cause the device 1105 to perform various aspects of repeater beam requests for transparent beam management as described herein, or the processor 1135 and the memory 1125 may be otherwise configured to perform or support such operations.

Figure 12:
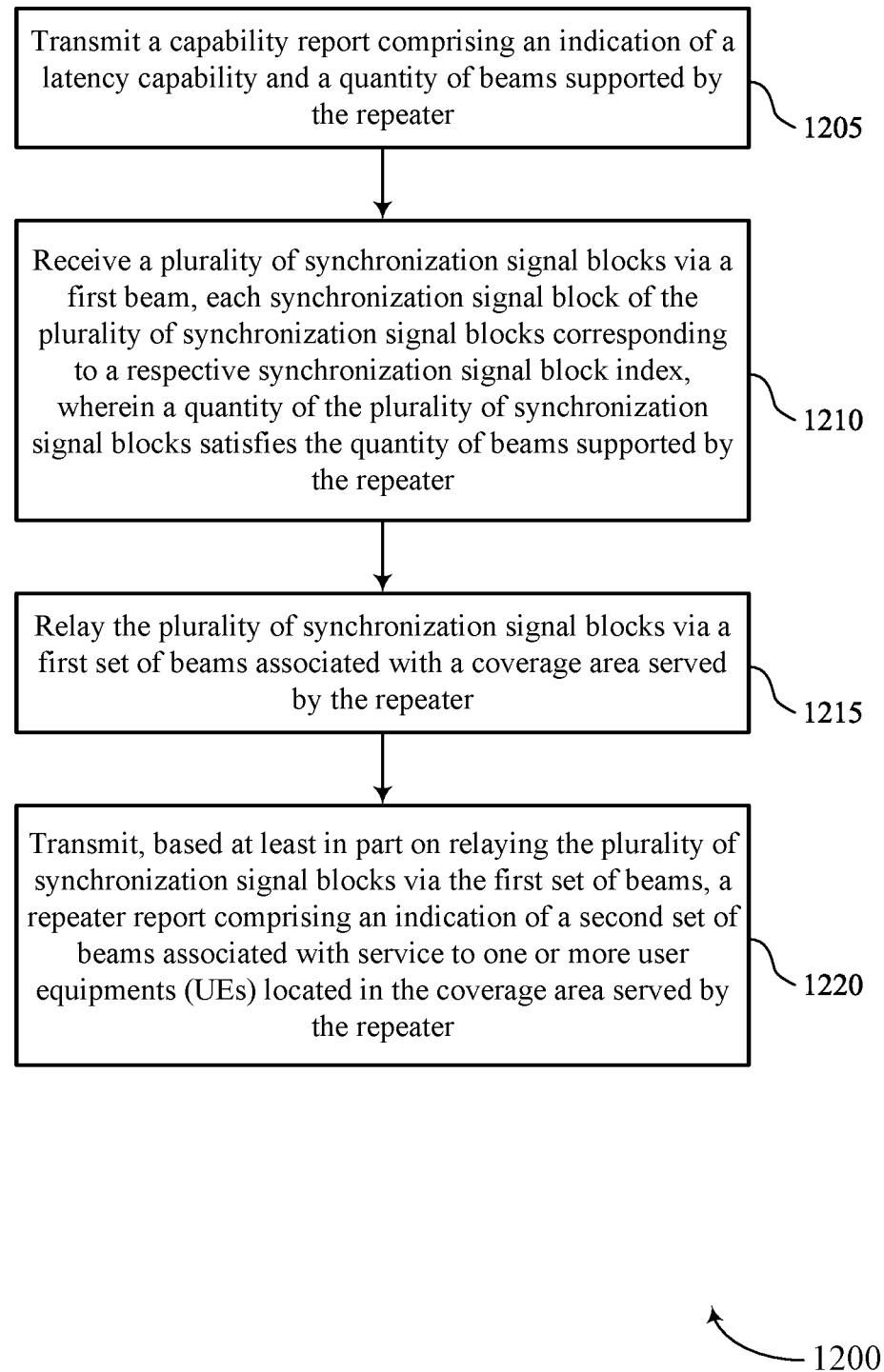
FIGS. 12 through 15 show flowcharts illustrating methods that support repeater beam requests for transparent beam management in accordance with one or more aspects of the present disclosure.

FIG. 12 shows a flowchart illustrating a method 1200 that supports repeater beam requests for transparent beam management in accordance with one or more aspects of the present disclosure. The operations of the method 1200 may be implemented by a repeater or its components as described herein. For example, the operations of the method 1200 may be performed by a repeater as described with reference to FIGS. 1 through 7. In some examples, a repeater may execute a set of instructions to control the functional elements of the repeater to perform the described functions. Additionally, or alternatively, the repeater may perform aspects of the described functions using special-purpose hardware.

At 1205, the method may include transmitting a capability report including an indication of a latency capability and a quantity of beams supported by the repeater. The operations of 1205 may be performed in accordance with examples as disclosed herein. In some examples, aspects of the operations of 1205 may be performed by a capability report manager 625 as described with reference to FIG. 6.

At 1210, the method may include receiving a set of multiple SSBs via a first beam, each SSB of the set of multiple SSBs corresponding to a respective SSB index, where a quantity of the set of multiple SSBs satisfies the quantity of beams supported by the repeater. The operations of 1210 may be performed in accordance with examples as disclosed herein. In some examples, aspects of the operations of 1210 may be performed by an SSB manager 630 as described with reference to FIG. 6.

At 1215, the method may include relaying the set of multiple SSBs via a first set of beams associated with a coverage area served by the repeater. The operations of 1215 may be performed in accordance with examples as disclosed herein. In some examples, aspects of the operations of 1215 may be performed by an SSB manager 630 as described with reference to FIG. 6.

At 1220, the method may include transmitting, based on relaying the set of multiple SSBs via the first set of beams, a repeater report including an indication of a second set of beams associated with service to one or more UEs located in the coverage area served by the repeater. The operations of 1220 may be performed in accordance with examples as disclosed herein. In some examples, aspects of the operations of 1220 may be performed by a repeater report manager 635 as described with reference to FIG. 6.

Figure 13:
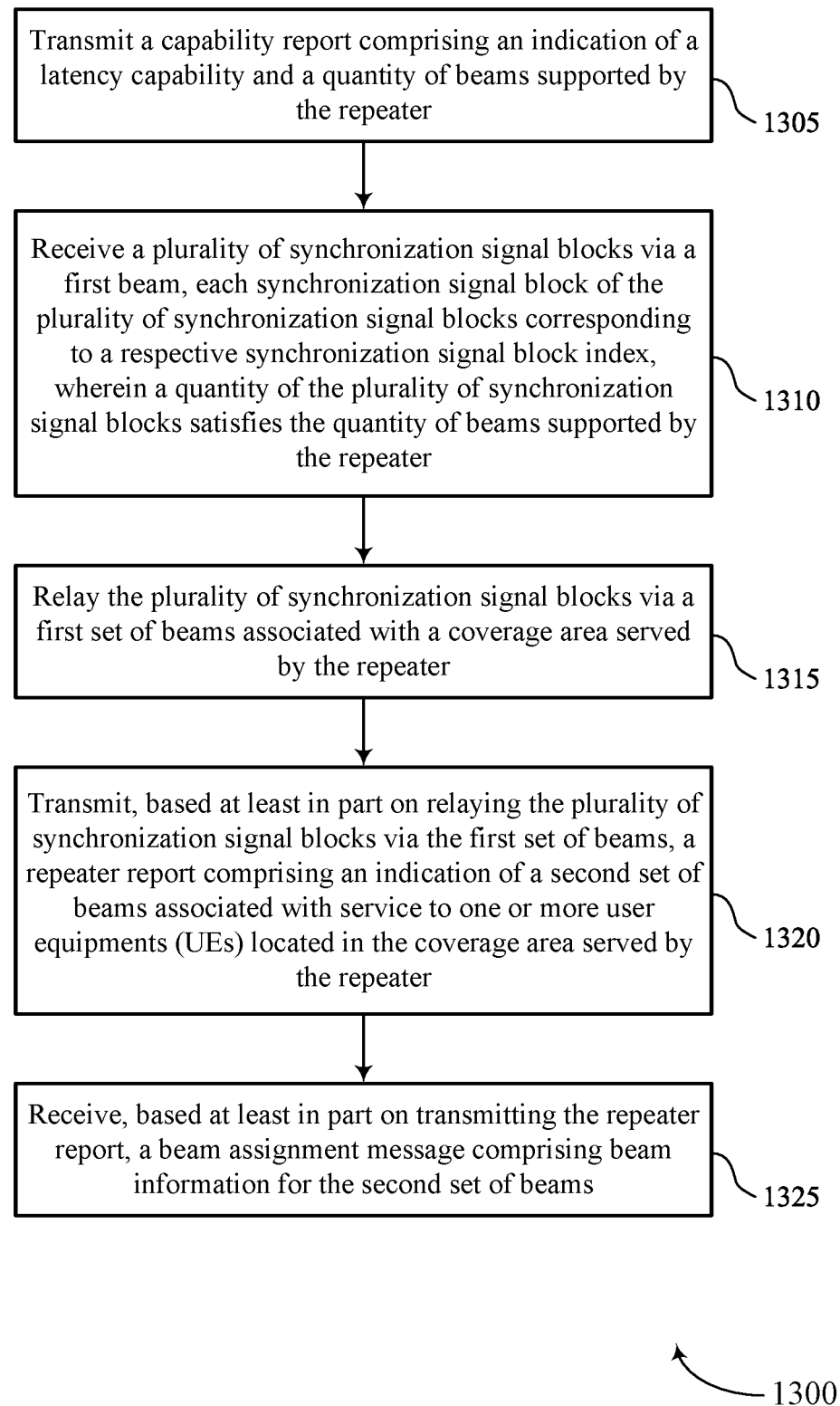

FIG. 13 shows a flowchart illustrating a method 1300 that supports repeater beam requests for transparent beam management in accordance with one or more aspects of the present disclosure. The operations of the method 1300 may be implemented by a repeater or its components as described herein. For example, the operations of the method 1300 may be performed by a repeater as described with reference to FIGS. 1 through 7. In some examples, a repeater may execute a set of instructions to control the functional elements of the repeater to perform the described functions. Additionally, or alternatively, the repeater may perform aspects of the described functions using special-purpose hardware.

At 1305, the method may include transmitting a capability report including an indication of a latency capability and a quantity of beams supported by the repeater. The operations of 1305 may be performed in accordance with examples as disclosed herein. In some examples, aspects of the operations of 1305 may be performed by a capability report manager 625 as described with reference to FIG. 6.

At 1310, the method may include receiving a set of multiple SSBs via a first beam, each SSB of the set of multiple SSBs corresponding to a respective SSB index, where a quantity of the set of multiple SSBs satisfies the quantity of beams supported by the repeater. The operations of 1310 may be performed in accordance with examples as disclosed herein. In some examples, aspects of the operations of 1310 may be performed by an SSB manager 630 as described with reference to FIG. 6.

At 1315, the method may include relaying the set of multiple SSBs via a first set of beams associated with a coverage area served by the repeater. The operations of 1315 may be performed in accordance with examples as disclosed herein. In some examples, aspects of the operations of 1315 may be performed by an SSB manager 630 as described with reference to FIG. 6.

At 1320, the method may include transmitting, based on relaying the set of multiple SSBs via the first set of beams, a repeater report including an indication of a second set of beams associated with service to one or more UEs located in the coverage area served by the repeater. The operations of 1320 may be performed in accordance with examples as disclosed herein. In some examples, aspects of the operations of 1320 may be performed by a repeater report manager 635 as described with reference to FIG. 6.

At 1325, the method may include receiving, based on transmitting the repeater report, a beam assignment message including beam information for the second set of beams. The operations of 1325 may be performed in accordance with examples as disclosed herein. In some examples, aspects of the operations of 1325 may be performed by a beam assignment manager 640 as described with reference to FIG. 6.

Figure 14:
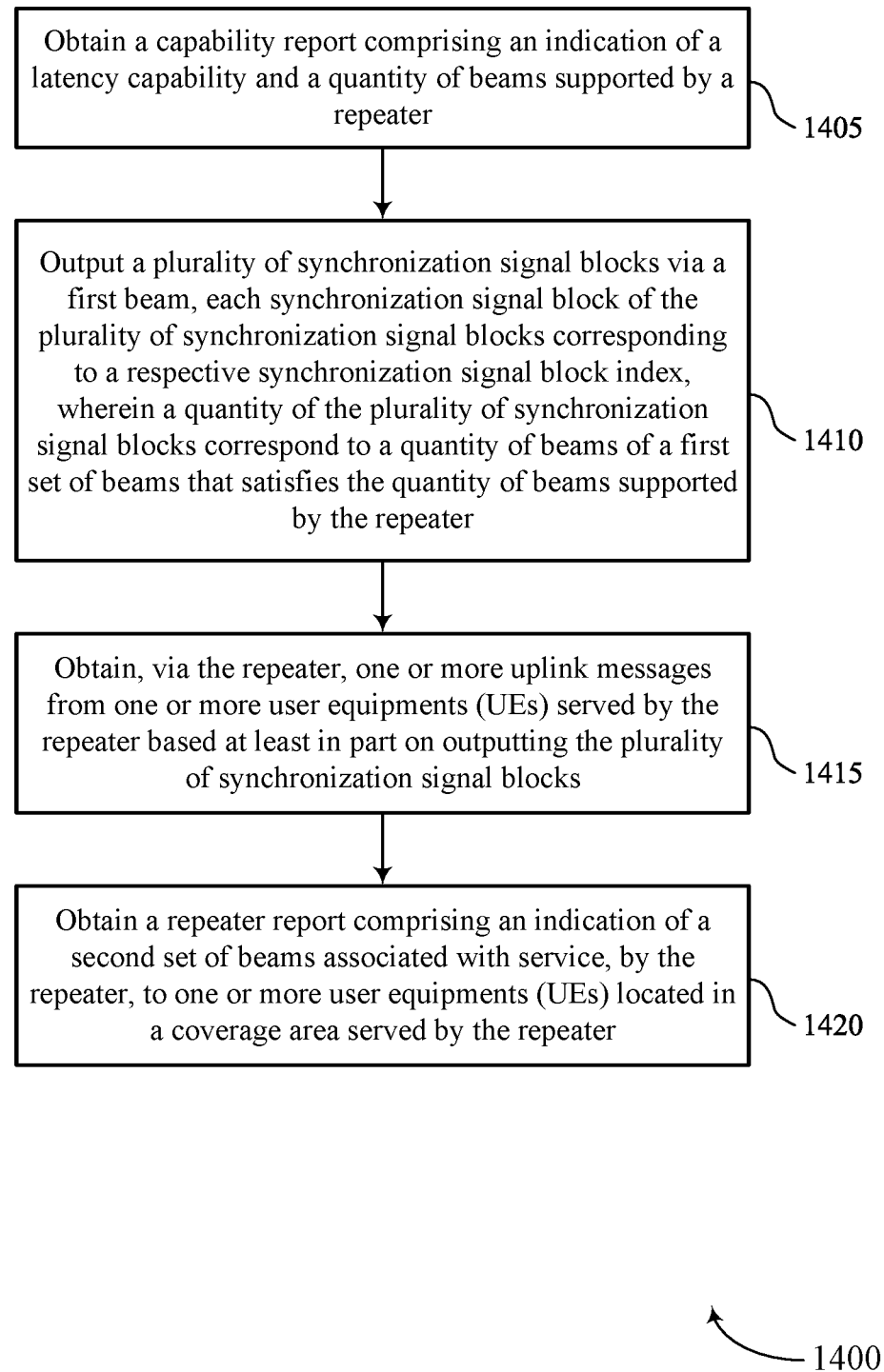

FIG. 14 shows a flowchart illustrating a method 1400 that supports repeater beam requests for transparent beam management in accordance with one or more aspects of the present disclosure. The operations of the method 1400 may be implemented by a network entity or its components as described herein. For example, the operations of the method 1400 may be performed by a network entity as described with reference to FIGS. 1 through 3 and 8 through 11. In some examples, a network entity may execute a set of instructions to control the functional elements of the network entity to perform the described functions. Additionally, or alternatively, the network entity may perform aspects of the described functions using special-purpose hardware.

At 1405, the method may include obtaining a capability report including an indication of a latency capability and a quantity of beams supported by a repeater. The operations of 1405 may be performed in accordance with examples as disclosed herein. In some examples, aspects of the operations of 1405 may be performed by a capability report manager 1025 as described with reference to FIG. 10.

At 1410, the method may include outputting a set of multiple SSBs via a first beam, each SSB of the set of multiple SSBs corresponding to a respective SSB index, where a quantity of the set of multiple SSBs correspond to a quantity of beams of a first set of beams that satisfies the quantity of beams supported by the repeater. The operations of 1410 may be performed in accordance with examples as disclosed herein. In some examples, aspects of the operations of 1410 may be performed by an SSB manager 1030 as described with reference to FIG. 10.

At 1415, the method may include obtaining, via the repeater, one or more uplink messages from one or more UEs served by the repeater based on outputting the set of multiple SSBs. The operations of 1415 may be performed in accordance with examples as disclosed herein. In some examples, aspects of the operations of 1415 may be performed by a relaying manager 1035 as described with reference to FIG. 10.

At 1420, the method may include obtaining a repeater report including an indication of a second set of beams associated with service, by the repeater, to one or more UEs located in a coverage area served by the repeater. The operations of 1420 may be performed in accordance with examples as disclosed herein. In some examples, aspects of the operations of 1420 may be performed by a repeater report manager 1040 as described with reference to FIG. 10.

Figure 15:
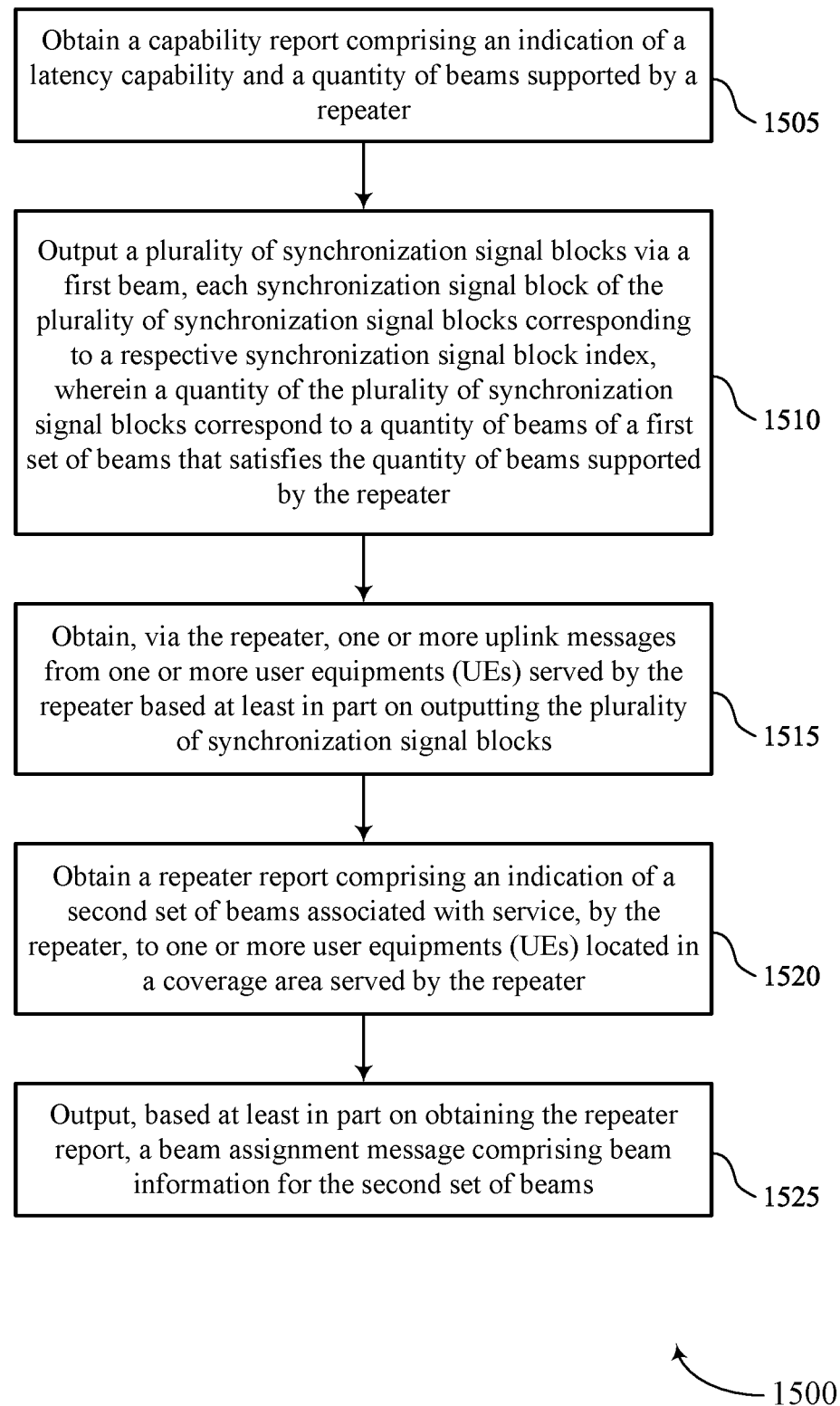

FIG. 15 shows a flowchart illustrating a method 1500 that supports repeater beam requests for transparent beam management in accordance with one or more aspects of the present disclosure. The operations of the method 1500 may be implemented by a network entity or its components as described herein. For example, the operations of the method 1500 may be performed by a network entity as described with reference to FIGS. 1 through 3 and 8 through 11. In some examples, a network entity may execute a set of instructions to control the functional elements of the network entity to perform the described functions. Additionally, or alternatively, the network entity may perform aspects of the described functions using special-purpose hardware.

At 1505, the method may include obtaining a capability report including an indication of a latency capability and a quantity of beams supported by a repeater. The operations of 1505 may be performed in accordance with examples as disclosed herein. In some examples, aspects of the operations of 1505 may be performed by a capability report manager 1025 as described with reference to FIG. 10.

At 1510, the method may include outputting a set of multiple SSBs via a first beam, each SSB of the set of multiple SSBs corresponding to a respective SSB index, where a quantity of the set of multiple SSBs correspond to a quantity of beams of a first set of beams that satisfies the quantity of beams supported by the repeater. The operations of 1510 may be performed in accordance with examples as disclosed herein. In some examples, aspects of the operations of 1510 may be performed by an SSB manager 1030 as described with reference to FIG. 10.

At 1515, the method may include obtaining, via the repeater, one or more uplink messages from one or more UEs served by the repeater based on outputting the set of multiple SSBs. The operations of 1515 may be performed in accordance with examples as disclosed herein. In some examples, aspects of the operations of 1515 may be performed by a relaying manager 1035 as described with reference to FIG. 10.

At 1520, the method may include obtaining a repeater report including an indication of a second set of beams associated with service, by the repeater, to one or more UEs located in a coverage area served by the repeater. The operations of 1520 may be performed in accordance with examples as disclosed herein. In some examples, aspects of the operations of 1520 may be performed by a repeater report manager 1040 as described with reference to FIG. 10.

At 1525, the method may include outputting, based on obtaining the repeater report, a beam assignment message including beam information for the second set of beams. The operations of 1525 may be performed in accordance with examples as disclosed herein. In some examples, aspects of the operations of 1525 may be performed by a beam assignment manager 1045 as described with reference to FIG. 10.

The following provides an overview of aspects of the present disclosure:

Aspect 1: A method for wireless communications at a repeater, comprising: transmitting a capability report comprising an indication of a latency capability and a quantity of beams supported by the repeater; receiving a plurality of SSBs via a first beam, each SSB of the plurality of SSBs corresponding to a respective SSB index, wherein a quantity of the plurality of SSBs satisfies the quantity of beams supported by the repeater; relaying the plurality of SSBs via a first set of beams associated with a coverage area served by the repeater; and transmitting, based at least in part on relaying the plurality of SSBs via the first set of beams, a repeater report comprising an indication of a second set of beams associated with service to one or more UEs located in the coverage area served by the repeater.

Aspect 2: The method of aspect 1, further comprising: receiving, based at least in part on transmitting the repeater report, a beam assignment message comprising beam information for the second set of beams.

Aspect 3: The method of aspect 2, wherein the beam assignment message comprises: an indication of a quantity of beams of the second set of beams, an indication of a beam direction for each beam of the second set of beams, or a combination thereof, wherein the second set of beams be different from the first set of beams.

Aspect 4: The method of any of aspects 2 through 3, wherein the beam assignment message comprises: a one-bit message indicating that the second set of beams is the same as the first set of beams.

Aspect 5: The apparatus of any of aspects 2 through 4, further comprising: receiving a second plurality of SSBs via the first beam, each SSB of the second plurality of SSBs corresponding to a respective SSB index, wherein a quantity of the second plurality of SSBs satisfies the second set of beams; and relaying the second plurality of SSBs via the second set of beams.

Aspect 6: The method of any of aspects 1 through 5, wherein the repeater report comprises: a quantity of beams of the second set of beams, a periodicity of the second set of beams, a threshold time between duplicate beams of the first set of beams, or a combination thereof.

Aspect 7: The method of any of aspects 1 through 6, further comprising: estimating a quantity of beams of the second set of beams based at least in part on a number of random access occasions associated with random access messages relayed by the repeater from the one or more UEs to a network entity, a quantity of UEs located in the coverage area served by the repeater, a spatial separation between respective beams of the first set of beams, or a combination thereof, wherein transmitting the repeater report is based at least in part on estimating the quantity of beams.

Aspect 8: The method of any of aspects 1 through 7, further comprising: determining a size of the coverage area served by the repeater based at least in part on one or more sensors, a preconfigured area input by a user, a history of locations of the one or more UEs served by the repeater, a quantity of messages received from the one or more UEs based on relaying the plurality of SSBs, or a combination thereof and estimating a quantity of beams of the second set of beams based at least in part on the size of the coverage area served by the repeater, wherein transmitting the repeater report are based at least in part on estimating the quantity of beams.

Aspect 9: The method of any of aspects 1 through 8, further comprising: relaying, based at least in part on relaying the plurality of SSBs, signaling from a network entity to one or more UEs served by the repeater, and signaling from the one or more UEs to the network entity.

Aspect 10: The method of aspect 9, wherein relaying the signaling from the network entity to the one or more UEs and the signaling from the one or more UEs to the network entity comprises: receiving random access messages associated with respective SSB indices of the plurality of SSBs from the one or more UEs using the first set of beams; and relaying the received random access messages to the network entity using the first beam.

Aspect 11: The method of any of aspects 1 through 10, further comprising: receiving, from a network entity, an indication of a set of SSB indices comprising each respective SSB index corresponding to each SSB of the plurality of SSBs; and determining, based at least in part on the indication of the set of SSB indices, a time occasion for receiving each SSB of the plurality of SSBs, wherein receiving the plurality of SSBs is based at least in part on the determining.

Aspect 12: A method for wireless communications at a network entity, comprising: obtaining a capability report comprising an indication of a latency capability and a quantity of beams supported by a repeater; outputting a plurality of SSBs via a first beam, each SSB of the plurality of SSBs corresponding to a respective SSB index, wherein a quantity of the plurality of SSBs correspond to a quantity of beams of a first set of beams that satisfies the quantity of beams supported by the repeater; obtaining, via the repeater, one or more uplink messages from one or more UEs served by the repeater based at least in part on outputting the plurality of SSBs; and obtaining a repeater report comprising an indication of a second set of beams associated with service, by the repeater, to one or more user equipments (UEs) located in a coverage area served by the repeater.

Aspect 13: The method of aspect 12, further comprising: outputting, based at least in part on obtaining the repeater report, a beam assignment message comprising beam information for the second set of beams.

Aspect 14: The method of aspect 13, wherein the beam assignment message comprises: an indication of a quantity of beams of the second set of beams, an indication of a beam direction for each beam of the second set of beams, or a combination thereof, wherein the second set of beams is different from the first set of beams.

Aspect 15: The method of any of aspects 13 through 14, wherein the beam assignment message comprises: a one-bit message indicating that the second set of beams is the same as the first set of beams.

Aspect 16: The method of any of aspects 13 through 15, wherein further comprising: outputting a second plurality of SSBs via a second beam, each SSB of the second plurality of SSBs corresponding to a respective SSB index, wherein a quantity of the second plurality of SSBs satisfies the second set of beams.

Aspect 17: The method of any of aspects 12 through 16, wherein the repeater report comprises: a quantity of beams of the second set of beams, a periodicity of the second set of beams, a threshold time between duplicate beams of the first set of beams, or a combination thereof.

Aspect 18: The method of any of aspects 12 through 17, further comprising: outputting an indication of a set of SSB indices comprising each respective SSB index corresponding to each SSB of the plurality of SSBs, wherein outputting the plurality of SSBs is based at least in part on outputting the indication of the set of SSB indices.

Aspect 19: An apparatus for wireless communications at a repeater, comprising a processor; memory coupled with the processor; and instructions stored in the memory and executable by the processor to cause the apparatus to perform a method of any of aspects 1 through 11.

Aspect 20: An apparatus for wireless communications at a repeater, comprising at least one means for performing a method of any of aspects 1 through 11.

Aspect 21: A non-transitory computer-readable medium storing code for wireless communications at a repeater, the code comprising instructions executable by a processor to perform a method of any of aspects 1 through 11.

Aspect 22: An apparatus for wireless communications at a network entity, comprising a processor; memory coupled with the processor; and instructions stored in the memory and executable by the processor to cause the apparatus to perform a method of any of aspects 12 through 18.

Aspect 23: An apparatus for wireless communications at a network entity, comprising at least one means for performing a method of any of aspects 12 through 18.

Aspect 24: A non-transitory computer-readable medium storing code for wireless communications at a network entity, the code comprising instructions executable by a processor to perform a method of any of aspects 12 through 18.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communications at a repeater, comprising:
one or more processors;
one or more memories in electronic communication with the one or more processors; and
instructions stored in the one or more memories, wherein the instructions are executable by the one or more processors to:
transmit a capability report comprising an indication of a latency capability and a first quantity of beams supported by the repeater;
receive a plurality of synchronization signal blocks via a first beam, each synchronization signal block of the plurality of synchronization signal blocks corresponding to a respective synchronization signal block index, wherein a quantity of the plurality of synchronization signal blocks satisfies the first quantity of beams supported by the repeater;
relay the plurality of synchronization signal blocks via a first set of beams associated with a coverage area served by the repeater;
estimate a second quantity of beams for a second set of beams associated with service to one or more user equipments (UEs) located in the coverage area served by the repeater based at least in part on relaying the plurality of synchronization signal blocks; and
transmit, based at least in part on relaying the plurality of synchronization signal blocks via the first set of beams, a repeater report comprising an indication of the second set of beams associated with service to the one or more UEs located in the coverage area served by the repeater and the second quantity of beams for the second set of beams.

2. The apparatus of claim 1, wherein the instructions are further executable by the one or more processors to:
receive, based at least in part on transmitting the repeater report, a beam assignment message comprising beam information for the second set of beams.

3. The apparatus of claim 2, wherein the beam assignment message comprises:
an indication of a quantity of beams of the second set of beams, an indication of a beam direction for each beam of the second set of beams, or a combination thereof, wherein the second set of beams is different from the first set of beams.

4. The apparatus of claim 2, wherein the beam assignment message comprises:
a one-bit message indicating that the second set of beams is the same as the first set of beams.

5. The apparatus of claim 2, wherein the instructions are further executable by the one or more processors to:
receive a second plurality of synchronization signal blocks via the first beam, each synchronization signal block of the second plurality of synchronization signal blocks corresponding to a respective synchronization signal block index, wherein a quantity of the second plurality of synchronization signal blocks satisfies the second set of beams; and
relay the second plurality of synchronization signal blocks via the second set of beams.

6. The apparatus of claim 1, wherein the repeater report comprises:
at least one of a periodicity of the second set of beams and a threshold time between duplicate beams of the first set of beams.

7. The apparatus of claim 1, wherein, to estimate the second quantity of beams, the instructions are further executable by the one or more processors to:
estimate the second quantity of beams of the second set of beams based at least in part on at least one of a quantity of random access occasions associated with random access messages relayed by the repeater from the one or more UEs to a network entity, a quantity of UEs located in the coverage area served by the repeater, and a spatial separation between respective beams of the first set of beams.

8. The apparatus of claim 1, wherein the instructions are further executable by the one or more processors to:
determine a size of the coverage area served by the repeater based at least in part on at least one of a preconfigured area input by a user, a history of locations of the one or more UEs served by the repeater, a quantity of messages received from the one or more UEs based on relaying the plurality of synchronization signal blocks, and one or more sensor; and
estimate a quantity of beams of the second set of beams based at least in part on the size of the coverage area served by the repeater, wherein the instructions executable by the one or more processors to transmit the repeater report are based at least in part on the instructions executable by the one or more processors to estimate the quantity of beams.

9. The apparatus of claim 1, wherein the instructions are further executable by the one or more processors to:
relay, based at least in part on relaying the plurality of synchronization signal blocks, signaling from a network entity to one or more UEs served by the repeater, and signaling from the one or more UEs to the network entity.

10. The apparatus of claim 9, wherein the instructions executable by the one or more processors to relay the signaling from the network entity to the one or more UEs and the signaling from the one or more UEs to the network entity comprise instructions executable by the one or more processors to:
receive random access messages associated with respective synchronization signal block indices of the plurality of synchronization signal blocks from the one or more UEs using the first set of beams; and
relay the received random access messages to the network entity using the first beam.

11. The apparatus of claim 1, wherein the instructions are further executable by the one or more processors to:
receive, from a network entity, an indication of a set of synchronization signal block indices comprising each respective synchronization signal block index corresponding to each synchronization signal block of the plurality of synchronization signal blocks; and
determine, based at least in part on the indication of the set of synchronization signal block indices, a time occasion for receiving each synchronization signal block of the plurality of synchronization signal blocks, wherein the instructions executable by the one or more processors to receive the plurality of synchronization signal blocks are based at least in part on the instructions executable by the one or more processors to determine the time occasion.

12. An apparatus for wireless communications at a network entity, comprising:
one or more processors;
one or more memories in electronic communication with the one or more processors; and
instructions stored in the one or more memories, wherein the instructions are executable by the one or more processors to:
obtain a capability report comprising an indication of a latency capability and a quantity of beams supported by a repeater;
output a plurality of synchronization signal blocks via a first beam, each synchronization signal block of the plurality of synchronization signal blocks corresponding to a respective synchronization signal block index, wherein a quantity of the plurality of synchronization signal blocks correspond to a first quantity of beams of a first set of beams that satisfies the quantity of beams supported by the repeater;
obtain, via the repeater, one or more uplink messages from one or more user equipments (UEs) served by the repeater based at least in part on outputting the plurality of synchronization signal blocks; and
obtain a repeater report comprising an indication of a second set of beams associated with service, by the repeater, to one or more UEs located in a coverage area served by the repeater and an estimated second quantity of beams for the second set of beams.

13. The apparatus of claim 12, wherein the instructions are further executable by the one or more processors to:
output, based at least in part on obtaining the repeater report, a beam assignment message comprising beam information for the second set of beams.

14. The apparatus of claim 13, wherein the beam assignment message comprises:
an indication of a beam direction for each beam of the second set of beams, wherein the second set of beams is different from the first set of beams.

15. The apparatus of claim 13, wherein the beam assignment message comprises:
a one-bit message indicating that the second set of beams is the same as the first set of beams.

16. The apparatus of claim 13, wherein the instructions are further executable by the one or more processors to cause the apparatus to:
output a second plurality of synchronization signal blocks via a second beam, each synchronization signal block of the second plurality of synchronization signal blocks corresponding to a respective synchronization signal block index, wherein a quantity of the second plurality of synchronization signal blocks satisfies the second set of beams.

17. The apparatus of claim 12, wherein the repeater report comprises:
at least one of a periodicity of the second set of beams and a threshold time between duplicate beams of the first set of beams.

18. The apparatus of claim 12, wherein the instructions are further executable by the one or more processors to cause the apparatus to:
output an indication of a set of synchronization signal block indices comprising each respective synchronization signal block index corresponding to each synchronization signal block of the plurality of synchronization signal blocks, wherein the instructions executable by the one or more processors to output the plurality of synchronization signal blocks are based at least in part on the instructions executable by the one or more processors to output the indication of the set of synchronization signal block indices.

19. A method for wireless communications at a repeater, comprising:
transmitting a capability report comprising an indication of a latency capability and a first quantity of beams supported by the repeater;
receiving a plurality of synchronization signal blocks via a first beam, each synchronization signal block of the plurality of synchronization signal blocks corresponding to a respective synchronization signal block index, wherein a quantity of the plurality of synchronization signal blocks satisfies the first quantity of beams supported by the repeater;
relaying the plurality of synchronization signal blocks via a first set of beams associated with a coverage area served by the repeater;
estimating a second quantity of beams for a second set of beams associated with service to one or more user equipments (UEs) located in the coverage area served by the repeater based at least in part on relaying the plurality of synchronization signal blocks; and
transmitting, based at least in part on relaying the plurality of synchronization signal blocks via the first set of beams, a repeater report comprising an indication of the second set of beams associated with service to the one or more UEs located in the coverage area served by the repeater and the second quantity of beams for the second set of beams.

20. The method of claim 19, further comprising:
receiving, based at least in part on transmitting the repeater report, a beam assignment message comprising beam information for the second set of beams.

21. The method of claim 20, further comprising:
receiving a second plurality of synchronization signal blocks via the first beam, each synchronization signal block of the second plurality of synchronization signal blocks corresponding to a respective synchronization signal block index, wherein a quantity of the second plurality of synchronization signal blocks satisfies the second set of beams; and
relaying the second plurality of synchronization signal blocks via the second set of beams.

22. The method of claim 19, wherein the repeater report comprises:
at least one of a periodicity of the second set of beams and a threshold time between duplicate beams of the first set of beams.

23. The method of claim 19, wherein estimating the second quantity of beams comprises:
the second quantity of beams of the second set of beams based at least in part on at least one of a quantity of random access occasions associated with random access messages relayed by the repeater from the one or more UEs to a network entity, a quantity of UEs located in the coverage area served by the repeater, and a spatial separation between respective beams of the first set of beams.

24. The method of claim 19, further comprising:
determining a size of the coverage area served by the repeater based at least in part on at least one of one a preconfigured area input by a user, a history of locations of the one or more UEs served by the repeater, a quantity of messages received from the one or more UEs based on relaying the plurality of synchronization signal blocks, and one or more sensors; and estimating a quantity of beams of the second set of beams based at least in part on the size of the coverage area served by the repeater, wherein transmitting the repeater report is based at least in part on the estimating.

25. The method of claim 19, further comprising:
relaying, based at least in part on relaying the plurality of synchronization signal blocks, signaling from a network entity to one or more UEs served by the repeater, and signaling from the one or more UEs to the network entity.

26. The method of claim 25, wherein the relaying comprises:
receiving random access messages associated with respective synchronization signal block indices of the plurality of synchronization signal blocks from the one or more UEs using the first set of beams; and
relaying the received random access messages to the network entity using the first beam.

27. The method of claim 19, further comprising:
receiving, from a network entity, an indication of a set of synchronization signal block indices comprising each respective synchronization signal block index corresponding to each synchronization signal block of the plurality of synchronization signal blocks; and
determining, based at least in part on the indication of the set of synchronization signal block indices, a time occasion for receiving each synchronization signal block of the plurality of synchronization signal blocks, wherein receiving the plurality of synchronization signal blocks is based at least in part on the determining.

28. A method for wireless communications at a network entity, comprising:
obtaining a capability report comprising an indication of a latency capability and a quantity of beams supported by a repeater;
outputting a plurality of synchronization signal blocks via a first beam, each synchronization signal block of the plurality of synchronization signal blocks corresponding to a respective synchronization signal block index, wherein a quantity of the plurality of synchronization signal blocks correspond to a first quantity of beams of a first set of beams that satisfies the quantity of beams supported by the repeater;
obtaining, via the repeater, one or more uplink messages from one or more user equipments (UEs) served by the repeater based at least in part on outputting the plurality of synchronization signal blocks; and
obtaining a repeater report comprising an indication of a second set of beams associated with service, by the repeater, to one or more UEs located in a coverage area served by the repeater and an estimated second quantity of beams for the second set of beams.

29. The method of claim 28, further comprising:
outputting, based at least in part on obtaining the repeater report, a beam assignment message comprising beam information for the second set of beams.

30. The method of claim 29, wherein the beam assignment message comprises:
an indication of a beam direction for each beam of the second set of beams, wherein the second set of beams is different from the first set of beams.

* * * * *